(12) United States Patent  
Minton

(10) Patent No.: US 10,400,407 B2
(45) Date of Patent: Sep. 3, 2019

(54) MODULAR WAVE-BREAK AND BULKHEAD SYSTEM

(71) Applicant: CHD Development, LLC, Lake Charles, LA (US)

(72) Inventor: David Minton, Lake Charles, LA (US)

(73) Assignee: CHD Development, LLC, Lake Charles, LA (US)

( * ) Notice: Subject to any disclaimer, the term of this patent is extended or adjusted under 35 U.S.C. 154(b) by 0 days.

(21) Appl. No.: 15/907,103

(22) Filed: Feb. 27, 2018

(65) Prior Publication Data

US 2018/0187387 A1 Jul. 5, 2018

Related U.S. Application Data

(60) Division of application No. 15/198,923, filed on Jun. 30, 2016, now Pat. No. 9,903,080, which is a continuation-in-part of application No. 14/011,975, filed on Aug. 28, 2013, now Pat. No. 9,382,681.

(60) Provisional application No. 61/834,116, filed on Jun. 12, 2013.

(51) Int. Cl.
*E02B 3/06* (2006.01)
*E02B 3/04* (2006.01)

(52) U.S. Cl.
CPC .................. *E02B 3/06* (2013.01); *E02B 3/04* (2013.01); *Y02A 10/22* (2018.01)

(58) Field of Classification Search
CPC .. E02B 3/06; E02B 3/04; Y02A 10/15; Y02A 10/14; Y02A 10/22
See application file for complete search history.

(56) References Cited

U.S. PATENT DOCUMENTS

| | | | |
|---|---|---|---|
| 905,596 A | 12/1908 | Smith | |
| 4,367,978 A | 1/1983 | Schaaf et al. | |
| 4,498,805 A | 2/1985 | Weir | |
| 4,711,598 A | 12/1987 | Schaaf et al. | |
| 4,776,725 A | 10/1988 | Brade | |
| 4,804,294 A | 2/1989 | Barthel | |
| 4,978,247 A | 12/1990 | Lenson | |
| 5,011,328 A | 4/1991 | Atkinson et al. | |
| 5,015,121 A | 5/1991 | Perret-Gentil | |
| 5,024,796 A | 6/1991 | Iwasa | |
| 5,697,736 A | 12/1997 | Veazey et al. | |
| 5,720,573 A | 2/1998 | Benedict et al. | |
| 5,879,105 A | 3/1999 | Bishop et al. | |
| 6,059,491 A | 5/2000 | Striefel et al. | |

(Continued)

*Primary Examiner* — Carib A Oquendo
(74) *Attorney, Agent, or Firm* — Schultz & Associates, P.C.

(57) ABSTRACT

A modular wave-break includes a wall, a base attached to the wall, and an anchor attached to the base. The wall includes a set of dissipating holes integrally formed in the wall and a set of passage holes integrally formed in the wall. Reinforcing structural rods may be embedded in the wall, the base, and the anchor to provide strength. Mounting holes in the base enable the modular wave-break to be secured to a water bottom surface. Multiple modular wave-breaks may be interconnected to form a single wave-break. In an alternate embodiment, a water control structure provides for management of the water table of a wetland area. The water control structure includes a panel comprising a wall, a base attached to the wall, an anchor attached to the base, and a flow hole through the wall. Multiple panels are connected in series to create a water tight water control structure.

21 Claims, 27 Drawing Sheets

(56) References Cited

U.S. PATENT DOCUMENTS

| | | |
|---|---|---|
| 6,491,473 B2 | 12/2002 | Veazey |
| 6,659,686 B2 | 12/2003 | Veazey |
| 6,932,539 B2 | 8/2005 | Benedict |
| 7,588,390 B2 | 9/2009 | Kelley |
| 7,762,205 B1 | 7/2010 | Veazey |
| 7,887,254 B2 | 2/2011 | Bishop |
| 7,896,582 B2 | 3/2011 | Chouery |
| 8,226,325 B1 | 7/2012 | Pierce |
| 8,313,265 B2 | 11/2012 | Taylor |
| 8,585,318 B1 | 11/2013 | Walker |
| 2004/0190993 A1 | 9/2004 | Archer-Simms et al. |
| 2006/0104719 A1 | 5/2006 | Fainman et al. |
| 2007/0253784 A1 | 11/2007 | Harrison, Jr. |
| 2011/0236132 A1 | 9/2011 | Wisegerber et al. |

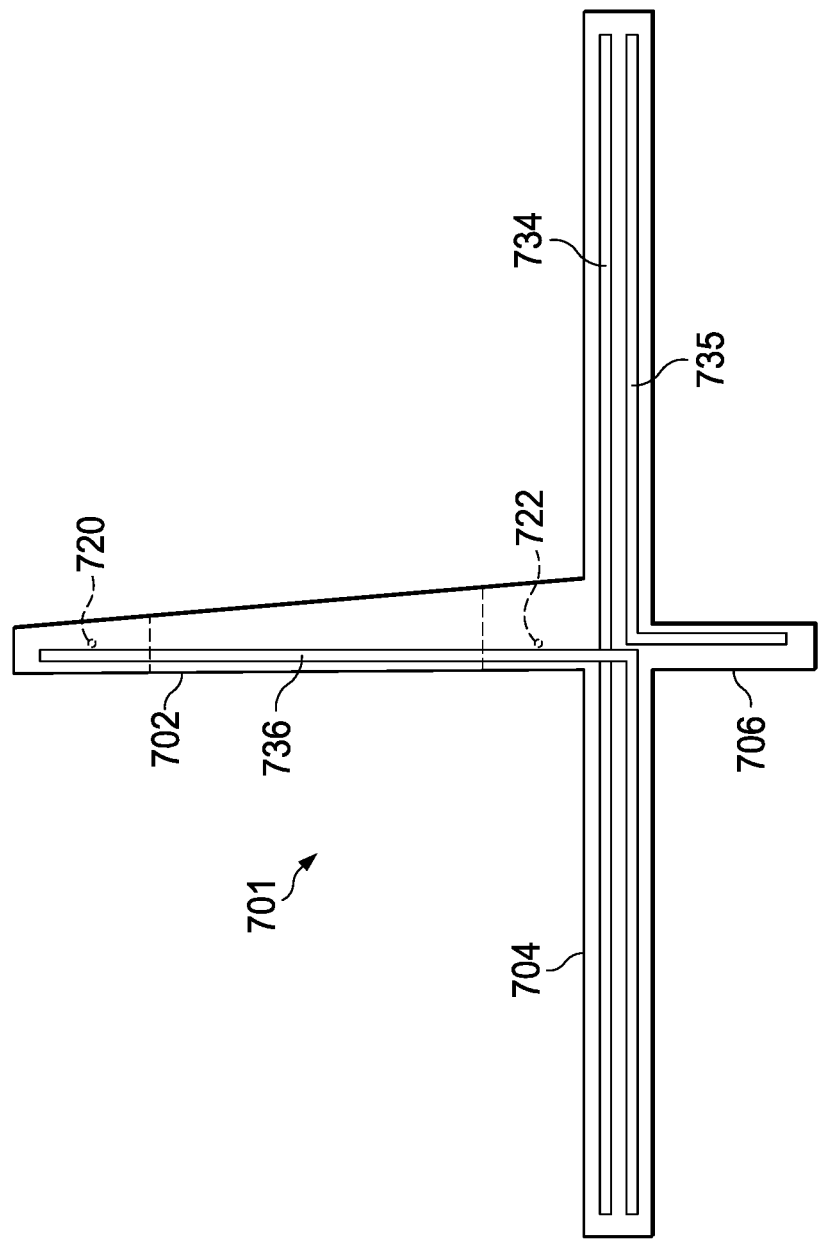

MODULAR WAVE-BREAK AND BULKHEAD SYSTEM

CROSS-REFERENCE TO RELATED APPLICATIONS

This application is a Divisional of application Ser. No. 15/198,923, filed Jun. 30, 2016, issued as U.S. Pat. No. 9,903,080 on Feb. 27, 2018, which is a Continuation-in-Part of application Ser. No. 14/011,975, filed Aug. 28, 2013, issued as U.S. Pat. No. 9,382,681 on Jul. 5, 2016, which claims priority to U.S. Provisional Application No. 61/834,116, filed Jun. 12, 2013. Each patent application identified above is incorporated here by reference in its entirety to provide continuity of disclosure.

FIELD OF INVENTION

This disclosure relates to an apparatus and method for dispersing the energy of a fluid wave, in particular, a low-energy wave near a shoreline and for controlling the water budget of a wetland area.

BACKGROUND OF THE INVENTION

Water going waves propagating towards and breaking near a shoreline have the potential to damage the shoreline if the energy from the waves is not dissipated. Typically, as a group of waves approach the shoreline, near a body of water such as a sea, a lake, a channel or shipping lane, the group of waves comes into contact with the water bottom. The group of waves will slow down and the wavelength of each wave will decrease. The energy of the wave is lost through contact with the water bottom. The shallower the water becomes the slower the wave moves, especially near the water bottom. As the wavelength decreases, the energy in the wave is transferred to increasing wave height. The steeper the water bottom gradient, the more pronounced the wave height will increase as the wave approaches the shore. Wave height will begin to increase when a wave experiences depths of around one half of its wavelength.

As a wave moves into increasingly shallow water, the bottom of the wave decreases in speed to a point where the top of the wave overtakes it and spills forward. The forward spilling of the wave breaks the wave, dissipating its energy at a rate consistent with the slope of the water bottom and head or tail winds. Generally, a wave begins to break when the wavefront reaches a water depth of about 1.3 times the wave height. After a wave breaks, the wave amplitude lessens as the energy is dissipated into eddy currents and turbulent flow.

Lower energy waves that do not naturally break can also cause damage. For example, ships moving through a shipping lane may create low energy waves that cause erosive effects on the nearby shoreline.

The prior art has attempted to address these problems with limited success. For example, U.S. Pat. No. 905,596 to Smith discloses a sea wall that includes a series of blocks that have cells or cavities on their exposed faces, permanent, entrenched, affixed to the land. However, the seawall cannot be deployed in the water and must be affixed to the land, thereby increasing the cost for installation. Further, the seawall does not allow fish or other sea animals to pass through, thereby requiring time consuming maintenance.

U.S. Pat. No. 4,498,805 to Weir discloses a breakwater for protecting a bank or bluff from erosion that comprises a plurality of similar modules resting on the ground bed below the water. Each module has a single, large, upwardly concave trough to absorb wave energy. The modules are tied together by a pair of cables extending through pairs of pipes embedded in the bases of the respective modules. However, the breakwater modules must be assembled in a straight line and cannot be deployed to conform to the contours of the shoreline.

U.S. Pat. No. 4,978,247 to Lenson discloses a modular erosion control breakwater device placed on the beach floor of a body of water. The device has a body portion having a first surface defining a seaward face and oppositely disposed therefrom a second surface defining a landward face. A plurality of holes extending between said first and second surfaces for the passage of water therethrough. However, the device in Lenson must be deployed in a straight line and cannot be deployed in a custom arrangement.

U.S. Pat. No. 5,697,736 to Veazey, et al. discloses an "L-wall", which is an L-shaped structural member intended for use in retaining walls and seawalls. The L-wall has a vertical wall or stem portion substantially perpendicular to a footer, and vertical key extending below the lower surface of the footer, in line with the vertical wall portion. Holes are preferably formed in the vertical wall and footer portions to provide drainage for liquid collecting behind the retaining wall or seawall. Holes can also be placed to facilitate handling and temporary interconnection of the L-members as well as drainage. However, the L-wall in Veazey requires the structure to be anchored to land and cannot be deployed to mirror the shape of the shoreline.

The prior art does not disclose or suggest a modular wave-break that can conform the shoreline upon deployment. Therefore, there is a need in the prior art for a modular wave-break having a tapered base for a custom arrangement upon deployment.

SUMMARY

In one embodiment, a modular wave-break is disclosed. In this embodiment, the modular wave-break includes a wall, a base attached to the wall, and an anchor attached to the base. The wall includes a set of dissipating holes integrally formed in the wall and a set of passage holes integrally formed in the wall. A set of eyebolts are connected to the wall. Reinforcing structural rods are embedded in the wall, the base, and the anchor to strengthen the modular wave-break. Mounting holes in the base enable the modular wave-break to be secured to a water bottom surface.

In one embodiment, the base has a set of tapered sides enabling a custom arrangement of a set of modular wave-breaks.

In one embodiment, the set of modular wave-breaks are interconnected to each other by a connector pin. The connector pin is inserted into the set of eyebolts of each adjacent modular wave-break. In one embodiment, a barrier is adhered to each rear surface of each modular wave-break to seal the set of modular wave-breaks.

In one embodiment, the wall is tapered on a rear surface facing the shoreline to strengthen the wall.

In another embodiment, a modular bulkhead is disclosed. In this embodiment, the modular bulkhead includes a wall, a base attached to the wall, and an anchor attached to the base. A set of eyebolts are connected to the wall. Reinforcing structural rods are embedded in the wall, the base, and the anchor to strengthen the modular bulkhead. The base includes a set of mounting holes through which the modular bulkhead is secured to a surface.

In one embodiment, a geotechnical barrier is attached to the wall to seal the wall.

In one embodiment, the base has a set of tapered sides enabling a custom arrangement of a set of modular bulkheads.

In one embodiment, the set of modular bulkheads are interconnected to each other by a connector pin to form a containment wall to separate a sediment area from water. The connector pin is inserted into the set of eyebolts of each adjacent modular bulkhead. The geotechnical barrier is adjacent the sediment area.

In one embodiment, the wall is tapered on a rear surface adjacent the sediment to strengthen the wall.

In another embodiment, a water control structure is disclosed. In this embodiment, the water control structure includes a series of panels where each panel comprises a wall, a base attached to the wall, and an anchor attached to the base. A set of post-tensioning reinforcement cables connect the panels in series and provide strength. Large passage holes in the wall allow water flow. The base includes a set of mounting holes through which the panels are secured to a surface.

BRIEF DESCRIPTION OF THE DRAWINGS

The disclosed embodiments will be described with reference to the accompanying drawings.

FIG. 7B is a side view of a water control structure panel of a preferred embodiment.

DETAILED DESCRIPTION

Figure 1A:
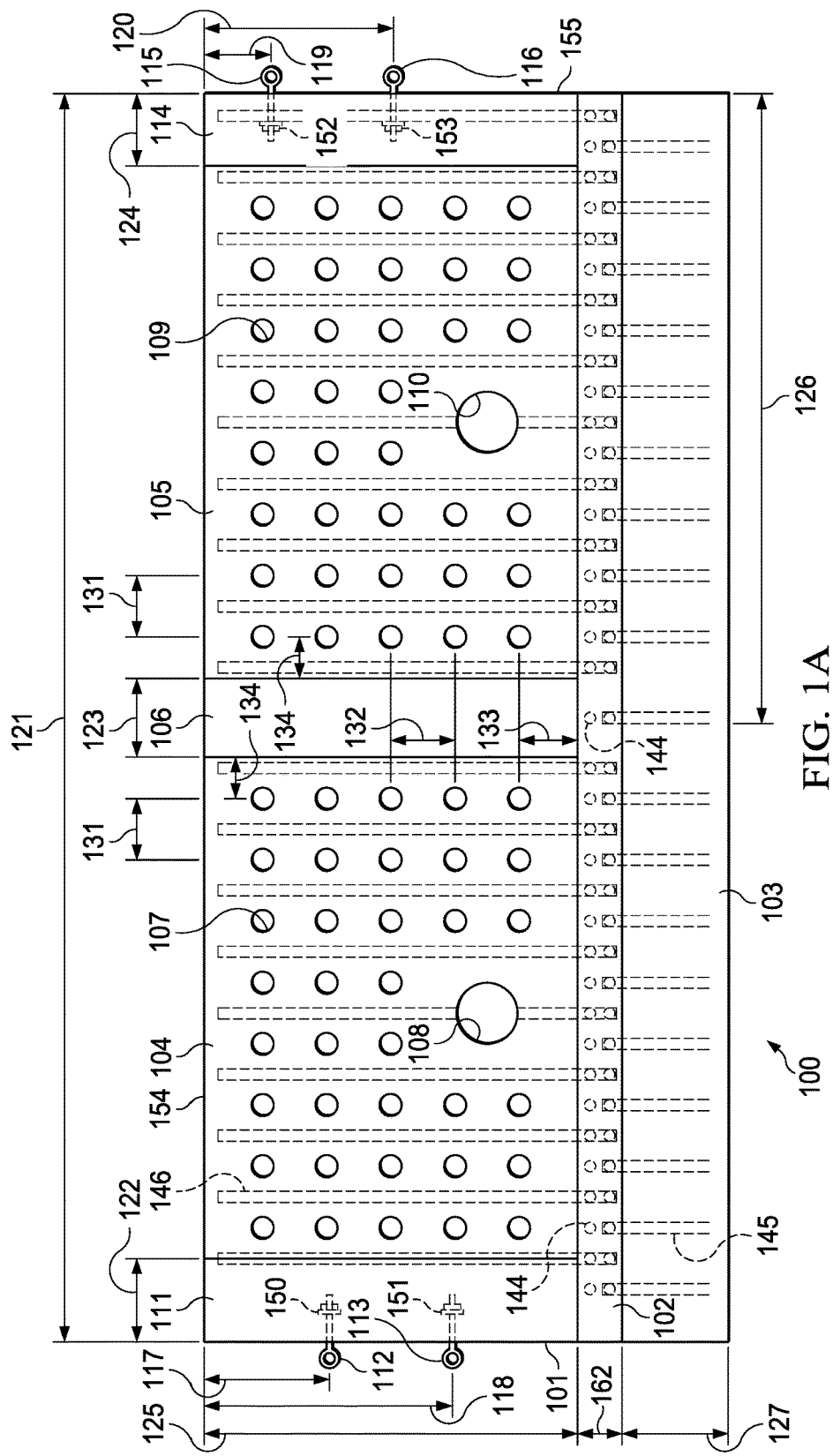
FIG. 1A is a front view of a low-energy modular wave-break of a preferred embodiment.

Referring to FIG. 1A, modular wave-break 100 includes wall 101 attached to base 102. Base 102 is attached to anchor 103.

Wall 101 includes wall portions 104 and 105 separated by central portion 106. Wall portion 104 includes set of dissipating holes 107 and passage hole 108. Wall portion 105 includes set of dissipating holes 109 and passage hole 110. Sets of dissipating holes 107 and 109 dissipate incoming waves and passage holes 108 and 110 allow sea creatures to move through wall 101.

In a preferred embodiment, sets of dissipating holes 107 and 109 are arranged in a grid-like pattern. Other geometric or non-geometric patterns may be employed.

In other embodiments, the number and configurations of sets of dissipating holes 107 and 109 vary depending on the strength of waves which will be dissipated.

In other embodiments, the number and configurations of passage holes 108 and 110 vary depending on the sea creatures in the location where modular wave-break 100 will be deployed.

In a preferred embodiment, each dissipating hole in sets of dissipating holes 107 and 109 is approximately 3 inches in diameter. Other diameters may be utilized.

In a preferred embodiment, each of passage holes 108 and 110 has a diameter of approximately 1 foot. Other diameters may be utilized.

Side portion 111 is attached to wall portion 104 opposite central portion 106. Eye bolts 112 and 113 are connected to side portion 111 with nuts 150 and 151, respectively. Side portion 114 is attached to wall portion 105 opposite central portion 106. Eye bolts 115 and 116 are connected to side portion 114 with nuts 152 and 153, respectively.

Wall 101 has width 121 and height 125. Side portion 111 has width 122. Central portion 106 has width 123. Side portion 114 has width 124. Central portion 106 is distance 126 on center from side edge 155. Anchor 103 has height 127. Each dissipating hole in sets of holes 107 and 109 are width 131 and height 132 from each other. Each set of dissipating holes 107 and 109 is height 133 from base 102 and distance 134 from central portion 106. Base 102 has thickness 162.

In a preferred embodiment, width 121 is approximately 20 feet. Other widths may be employed.

In a preferred embodiment, height 125 is approximately 6 feet. Other heights may be employed.

In a preferred embodiment, width 122 is approximately 1 foot. Other widths may be employed.

In a preferred embodiment, width 123 is approximately 1 foot. Other widths may be employed.

In a preferred embodiment, width 124 is approximately 1 foot. Other widths may be employed.

In a preferred embodiment, distance 126 is approximately 10 feet. Other distances may be employed.

In a preferred embodiment, height 127 is approximately 1 foot, 9 inches. Other heights may be employed.

In a preferred embodiment, width 131 is approximately 1 foot. Other widths may be employed.

In a preferred embodiment, height 132 is approximately 1 foot. Other heights may be employed.

In a preferred embodiment, height 133 is approximately 1 foot. Other heights may be employed.

In a preferred embodiment, distance 134 is approximately 9 inches. Other distances may be employed.

In a preferred embodiment, thickness 162 is approximately 8 inches. Other thicknesses may be employed.

Eye bolt 112 is distance 117 from top edge 154 of wall 101. Eye bolt 113 is distance 118 from top edge 154 of wall 101. Eye bolt 115 is distance 119 from top edge 154 of wall 101. Eye bolt 116 is distance 120 from top edge 154 of wall 101.

In a preferred embodiment, distance 117 is approximately 2 feet. In this embodiment, distance 118 is approximately 4 feet. In this embodiment, distance 119 is approximately 1 foot. In this embodiment, distance 120 is approximately 3 feet. Hence, eye bolts 112 and 113 are staggered in distance from top edge 154 with respect to eye bolts 115 and 116 to enable a modular connection with multiple wave-breaks as will be further described below. Other connection systems known in the art may be employed.

In a preferred embodiment, nuts 150, 151, 152, and 153 are embedded in vertical portion 101 with washers to provide pull out resistance.

In a preferred embodiment, each of eye bolts 112, 113, 115, and 116 has a set of dimensions of approximately 1¼ inches×10 inches. Other dimensions may be employed.

In a preferred embodiment, each of eye bolts 112, 113, 115, and 116 is screwed into nuts 150, 151, 152, and 153, respectively so that each of eye bolts 112, 113, 115, and 116 is open in the vertical direction.

Figure 1B:
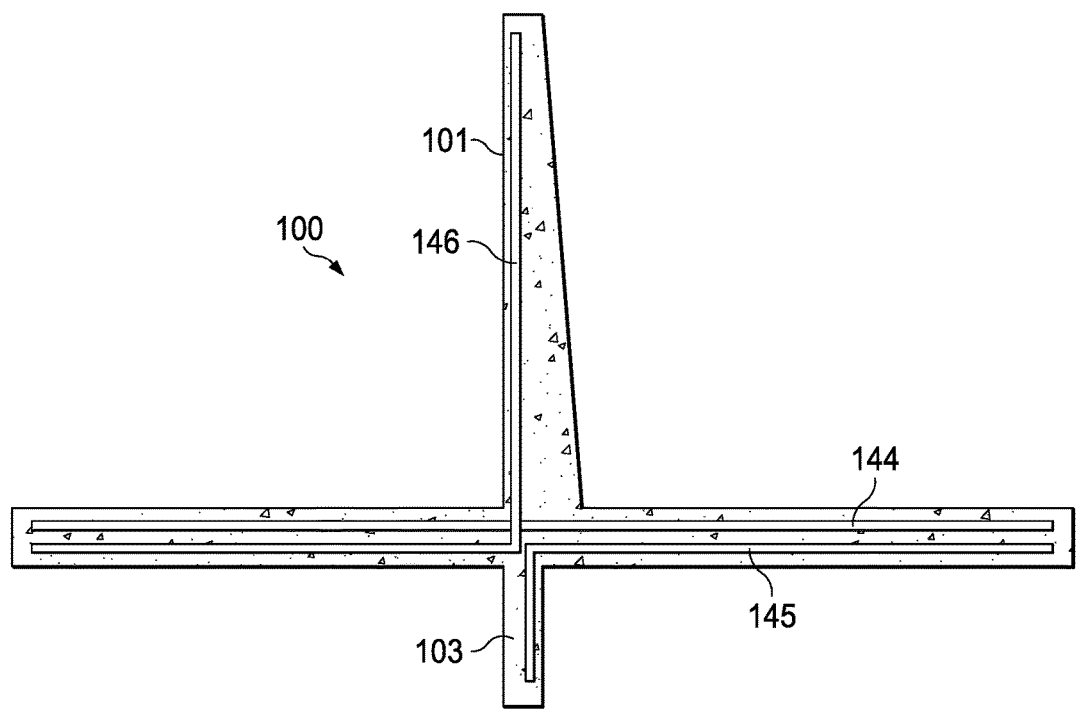
FIG. 1B is a cross-sectional view of reinforcing bar of a low-energy modular wave-break of a preferred embodiment.

Referring to FIGS. 1A and 1B, modular wave-break 100 includes structural bar 144 in base 102, structural bar 145 in base 102 and anchor 103, structural bar 146 in wall 101 and base 102.

Structural bars 144, 145, and 146 are embedded throughout modular wave-break 100 across width 121. In a preferred embodiment, each of horizontal structural bars 144 is placed 6" on center to reinforce base 102. In this embodiment, each of upper structural bars 146 is placed 12 inches on center, between each column of sets of dissipating holes 107 and 109 and at every other horizontal structural bar 144, and bent to provide reinforcement between wall 101 and base 102. In this embodiment, each of lower structural bars 145 is placed 12 inches on center, at every other horizontal structural bar 144 not aligned with the set of upper structural bars 146. Set of lower structural bars 145 is bent to provide reinforcement between anchor 103 and base 102.

Figure 1C:
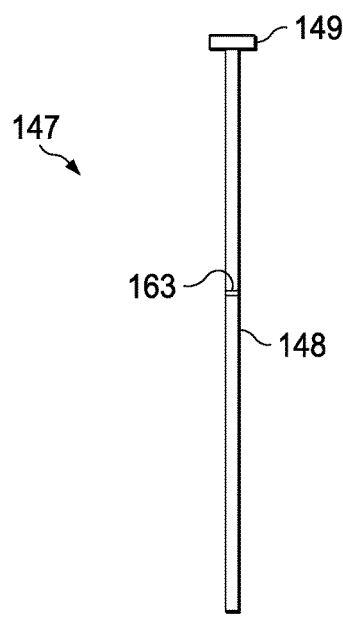
FIG. 1C is a side view of a connector pin for a low-energy modular wave-break of a preferred embodiment.

Referring to FIG. 1C, connector pin 147 includes shaft 148 and head 149 attached to shaft 148. Shaft 148 includes hole 163. In use, connector pin is inserted through a set of eyebolts to connect multiple modular wave-breaks 100 and a bolt is inserted through hole 163 and secured with a nut to hold connector pin 147 in place when connecting multiple modular wave-breaks as will be further described below. Other fasteners known in the art may be employed.

In a preferred embodiment, connector pin 147, eye bolts 112, 113, 115, and 116, and nuts 150, 151, 152, and 153 are made of 316 stainless steel. Other suitable materials known in the art may be employed.

In another embodiment, a set of stainless steel cables can be employed to secure multiple modular wave-breaks together by stringing the steel cables through the eyebolts. The set of stainless steel cables would preferably be placed on the load bearing side to facilitate additional structural integrity and system stability.

Figure 1D:
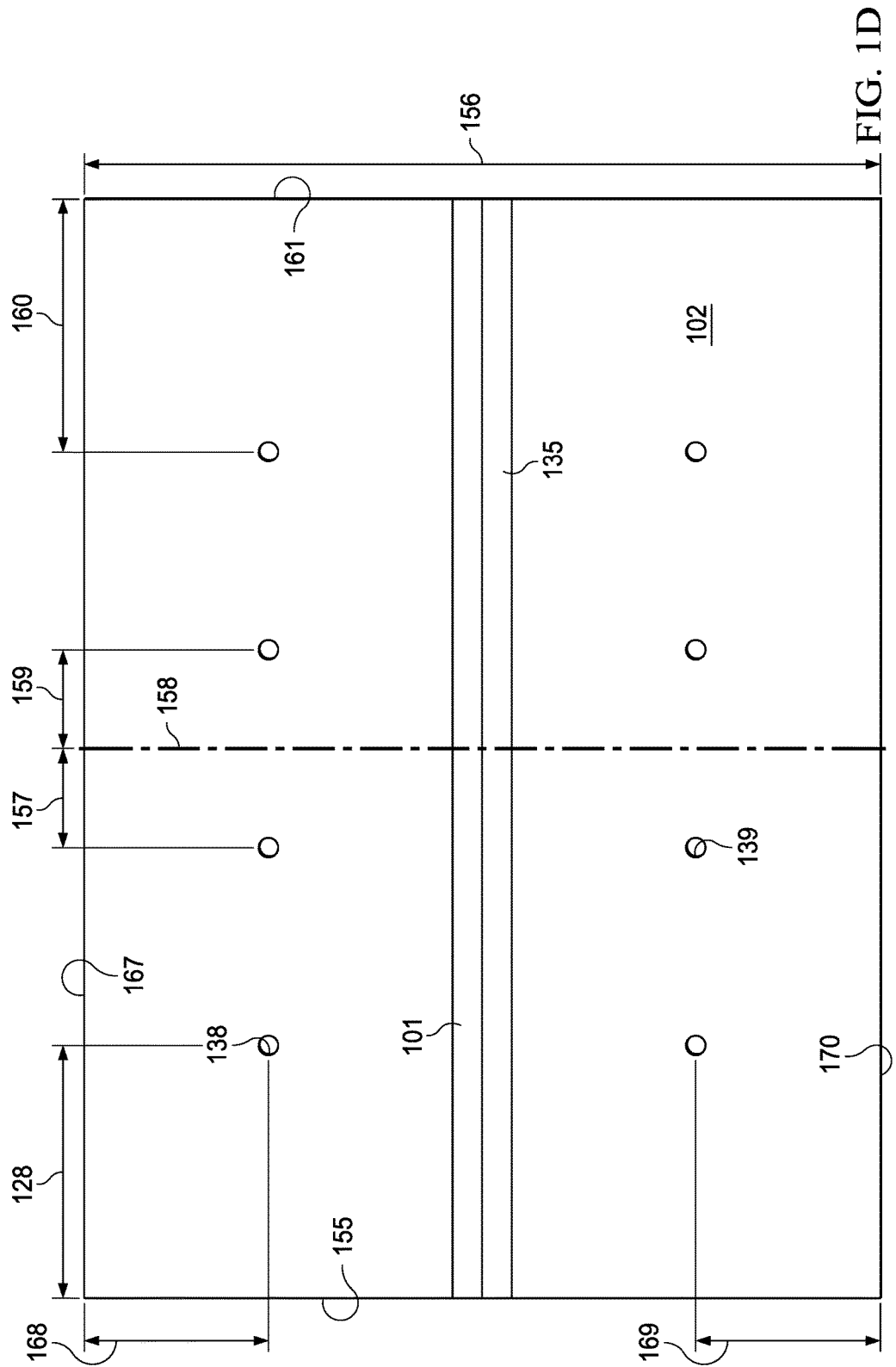
FIG. 1D is a top view of one embodiment of a low-energy modular wave-break.

Referring to FIG. 1D in one embodiment, base 102 has sets of mounting holes 138 and 139, sides 155, 161, 167, and 170, and length 156. Sets of mounting holes 138 and 139 provide lift points for installing and/or moving modular wave-break 100 and provide mounting support for mounting modular wave-break 100 to a structure as will be described below.

Set of mounting holes 138 is located distance 128 from side 155, distance 160 from side 161, distance 157 from center line 158, distance 159 from center line 158, and distance 168 from side 167.

Set of mounting holes 139 is located distance 128 from side 155, distance 160 from side 161, distance 157 from center line 158, distance 159 from center line 158, and distance 169 from side 170.

In a preferred embodiment, length 156 is approximately 12 feet. Other lengths may be employed.

In a preferred embodiment, each of distances 128 and 160 is approximately 2 feet, four inches. Other distances may be employed.

In a preferred embodiment, each of distances 157 and 159 is approximately 2 feet, four inches. Other distances may be employed.

In a preferred embodiment, each of distances 168 and 169 is approximately 2 feet, 6 inches. Other distances may be employed.

Figure 1E:
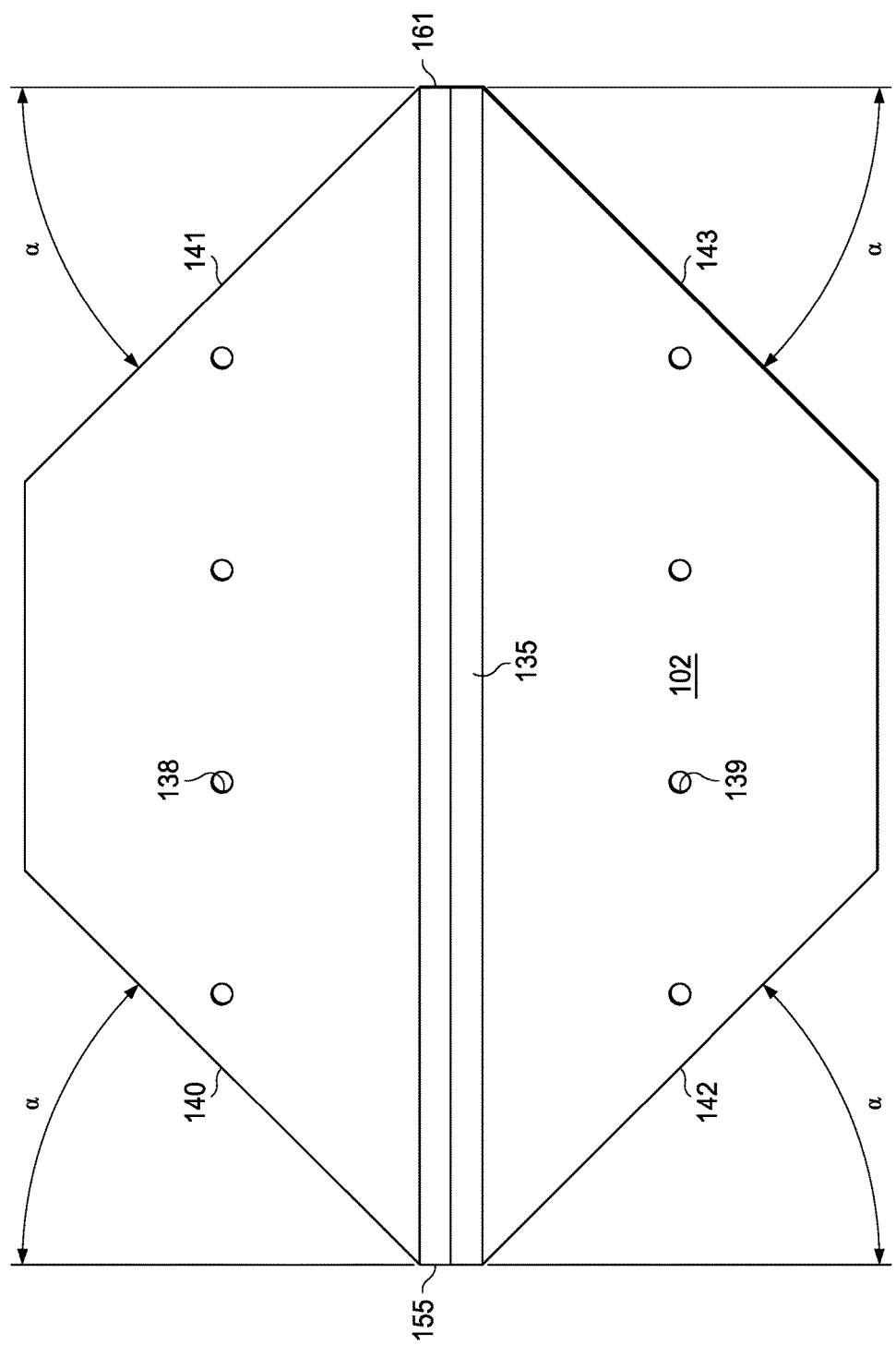
FIG. 1E is a top view of one embodiment of a low-energy modular wave-break.

Referring to FIG. 1E in another embodiment, base 102 has tapered sides 140, 141, 142, and 143. Each of tapered sides 140 and 142 tapers at angle α off-set from side 155 and each of tapered sides 141 and 143 tapers at angle α off-set from side 161.

In other embodiments, each of tapered sides 140, 141, 142, and 143 tapers at a different angle off-set from its respective side with respect to each other.

In a preferred embodiment, angle α is approximately 30 degrees. In another embodiment, angle α is approximately 15 degrees. In another embodiment, angle α is approximately 45 degrees. Other angles may be employed.

In a preferred embodiment, each of structural bars 144, 145, and 146 is no. 6 size, having a minimum of 60 ksi yield tensile strength and made of fiberglass. Other suitable materials known in the art may be employed.

Figure 1F:
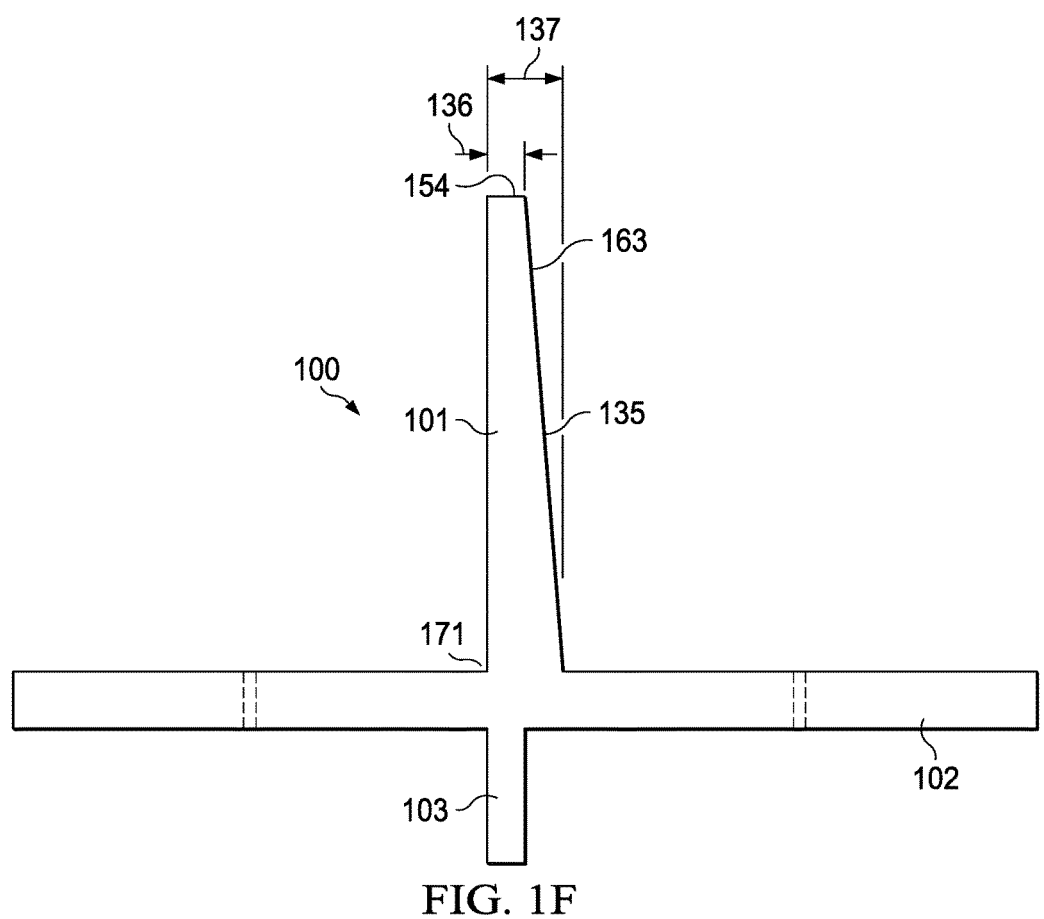
FIG. 1F is a side view of one embodiment of a low-energy modular wave-break.

Referring to FIG. 1F in one embodiment, rear surface 163 of wall 101 includes taper 135. Taper 135 tapers from thickness 136 at top edge 154 to thickness 137 at bottom 171 of wall 101. Taper 135 of wall 101 is included for additional load support and is placed toward the land side as will be further described below. Anchor 103 has thickness 136.

In a preferred embodiment, thickness 136 is approximately 6 inches. Other thicknesses may be employed.

In a preferred embodiment, thickness 137 is approximately 1 foot. Other thicknesses may be employed.

Figure 1G:
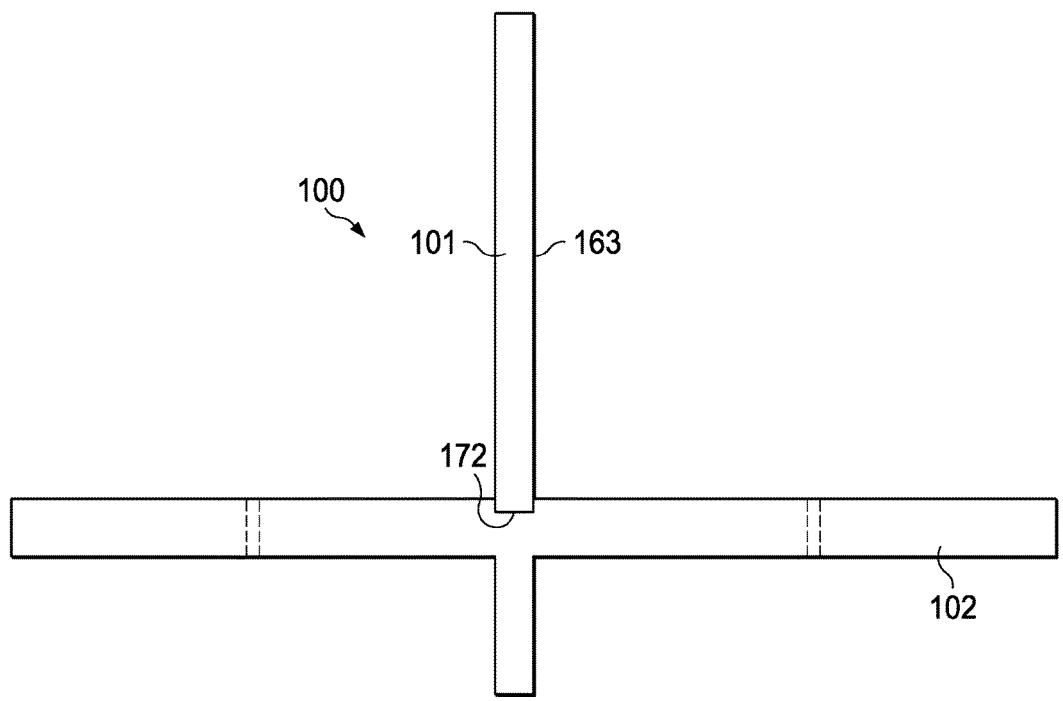
FIG. 1G is a side view of one embodiment of a low-energy modular wave-break.

Referring to FIG. 1G in another embodiment, rear surface 163 of wall 101 is generally perpendicular to base 102, without taper 135.

Figure 1H:
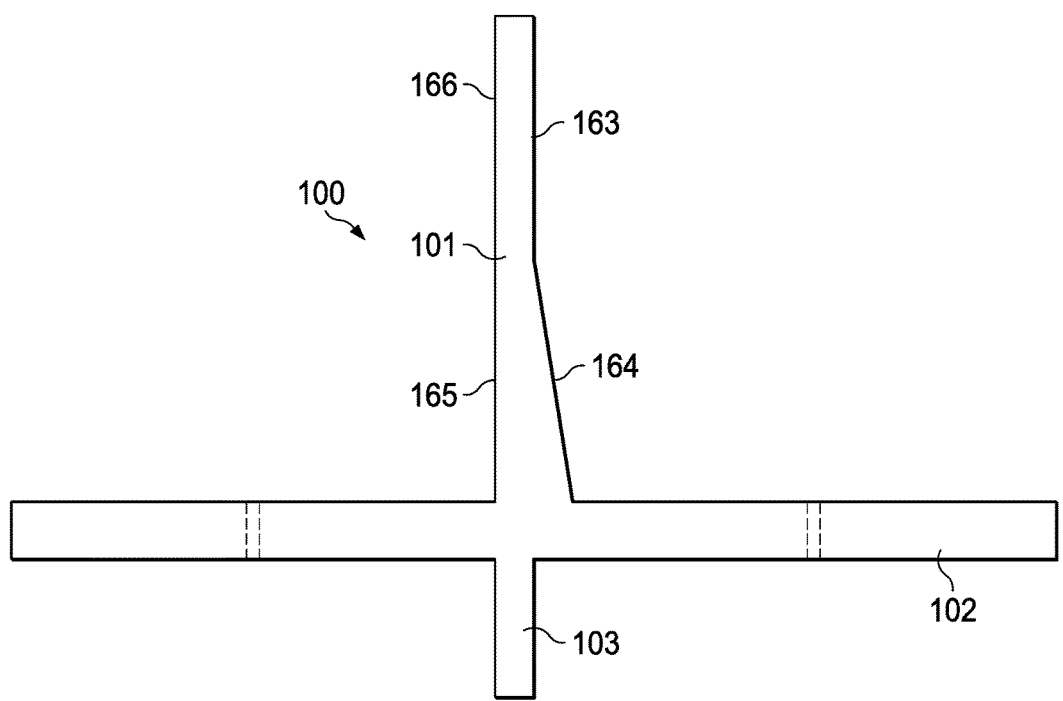
FIG. 1H is a side view of one embodiment of a low-energy modular wave-break.

Referring to FIG. 1H in another embodiment, rear surface 163 includes taper 164. Taper 164 does not cover the entire rear surface 163 of the wall 101. In this embodiment, lower half 165 of wall 101 has taper 164 and upper half 166 is generally perpendicular to base 102.

In a preferred embodiment, wall 101, base 102, and anchor 103 are cast as a whole in 5,000 psi concrete having a unit weight of approximately 105 lb./cubic ft. and including structural bars 144, 145, and 146.

In one embodiment, wave-break 100 may be poured in two pours with cold joint 172 connecting wall 101 to base 102.

Figure 2A:
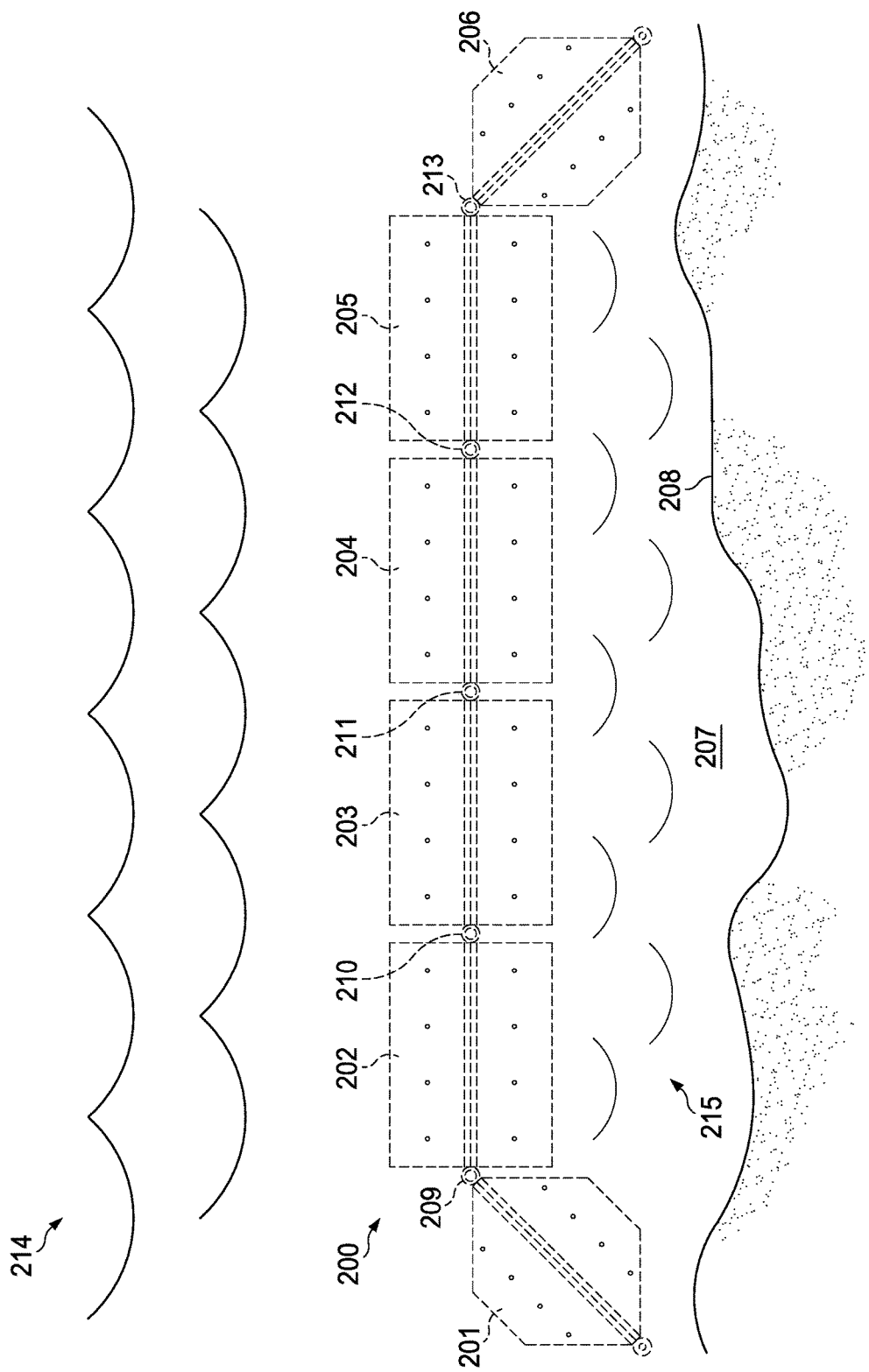
FIG. 2A is a top view of a placement of a set of modular wave-breaks near a shoreline in one embodiment.

Referring to FIG. 2A, set of modular wave-breaks 200 includes modular wave-breaks 201, 202, 203, 204, 205, and 206 to form a single wave-break system. Modular wave-breaks 201 and 202 are connected with connector pin 209. Modular wave-breaks 202 and 203 are connected with connector pin 210. Modular wave-breaks 203 and 204 are connected with connector pin 211. Modular wave-breaks 204 and 205 are connected with connector pin 212. Modular wave-breaks 205 and 206 are connected with connector pin 213. Set of modular wave-breaks 200 is placed on water bottom surface 207, near shoreline 208.

Waves 214 propagating towards shoreline 208 are broken into dissipated waves 215 by set of modular wave-breaks 200, protecting shoreline 208 from erosion and beachgoers from dangers such as excessive undertow.

Figure 2B:
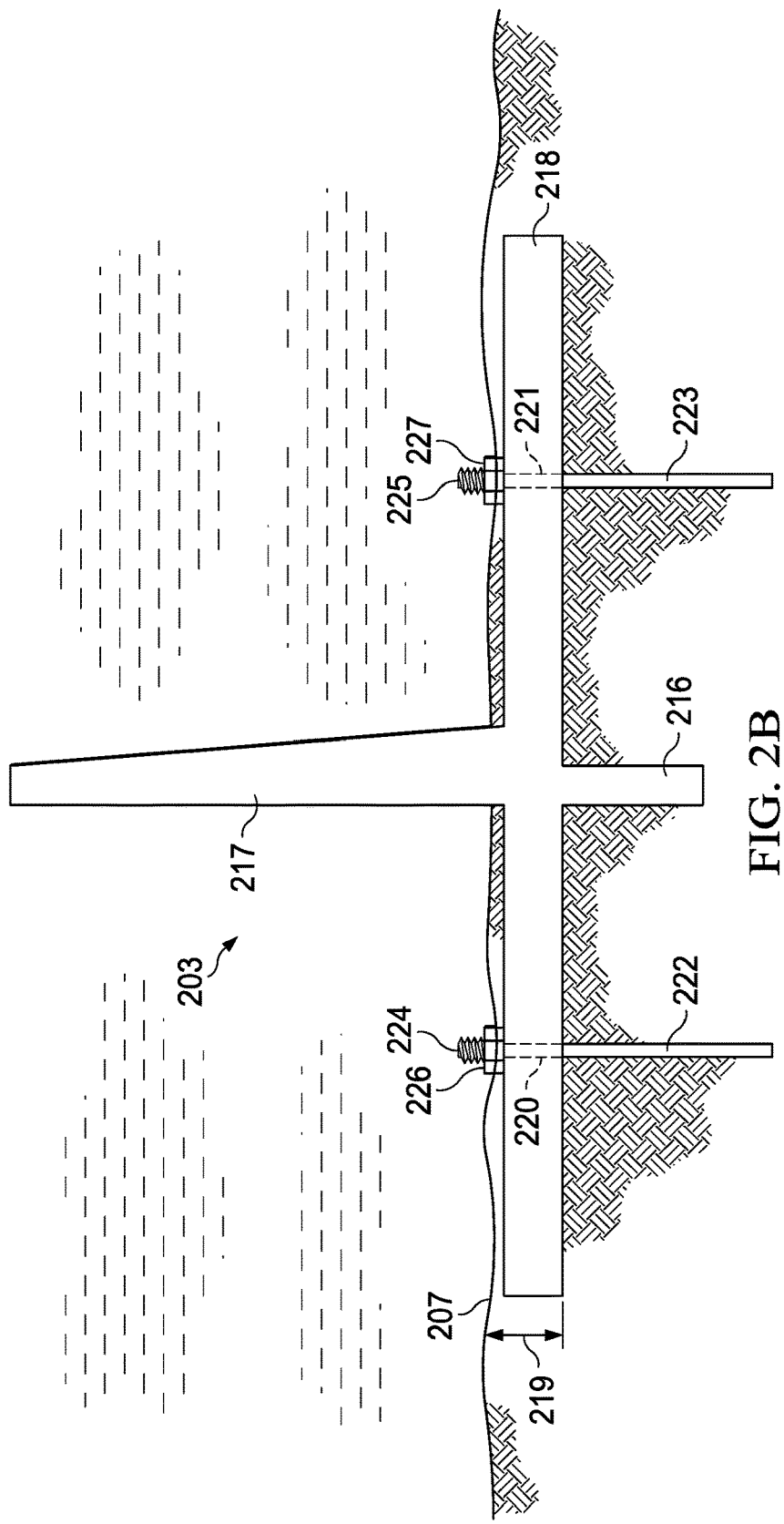
FIG. 2B is a side view of a modular wave-break anchored to a water bottom surface.

Referring to FIG. 2B by way of example, anchor 216 of modular wave-break 203 is buried below water bottom surface 207. Wall 217 is above water bottom surface 207. Base 218 is buried immediately below water bottom surface 207 at depth 219.

In a preferred embodiment, depth 219 is approximately 1 foot. Other depths may be employed.

Mounting rod 222 is inserted through mounting hole 220 of base 218. Nut 226 is engaged with threaded portion 224 of mounting rod 222 to secure modular wave-break 203 to water bottom surface 207. Mounting rod 223 is inserted through mounting hole 221 of base 218. Nut 227 is engaged with threaded portion 225 of mounting rod 223 to secure modular wave-break 203 to water bottom surface 207.

Figure 3:
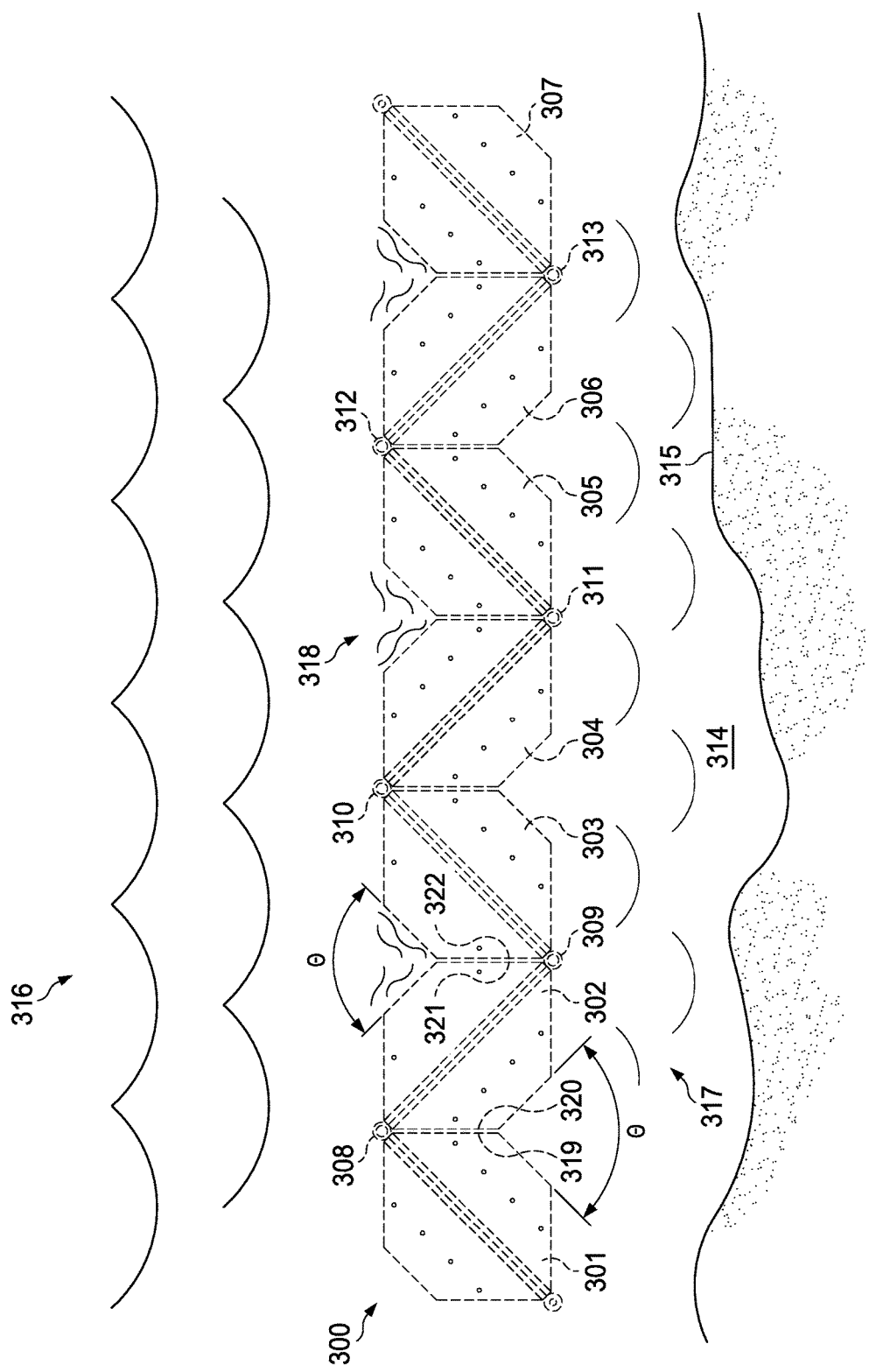
FIG. 3 is a top view of a placement of a set of modular wave-breaks near a shoreline in one embodiment.

Referring to FIG. 3 in another embodiment by way of example, set of modular wave-breaks 300 includes modular wave-breaks 301, 302, 303, 304, 305, 306, and 307 to form a singular wave-break system. Modular wave-breaks 301 and 302 are connected with connector pin 308. Modular wave-breaks 302 and 303 are connected with connector pin 309. Modular wave-breaks 303 and 304 are connected with connector pin 310. Modular wave-breaks 304 and 305 are connected with connector pin 311. Modular wave-breaks 305 and 306 are connected with connector pin 312. Modular wave-breaks 306 and 307 are connected with connector pin 313.

Set of modular wave-breaks 300 is placed on water bottom surface 314 in a "zigzag" pattern, near shoreline 315 and secured to water bottom surface 314 as previously described. By way of example, modular wave-break 301 has tapered side 319, modular wave-break 302 has tapered sides 320 and 321, and modular wave break 303 has tapered side 322. Tapered sides 319, 320, 321, and 322 enable modular wave-breaks 301, 302, and 303 to be positioned off-center at angle θ and enabling set of modular wave-breaks to be positioned at any desirable configuration.

Waves 316 propagate towards shoreline 315 and are broken into a set of dissipated waves 317 and smaller reflected waves 318 by set of modular wave-breaks 300. Other configurations of set of modular wave-breaks 300 may be employed, depending upon the strength of the waves.

In a preferred embodiment, angle θ is in a range of approximately 30° to 180°.

Figure 4A:
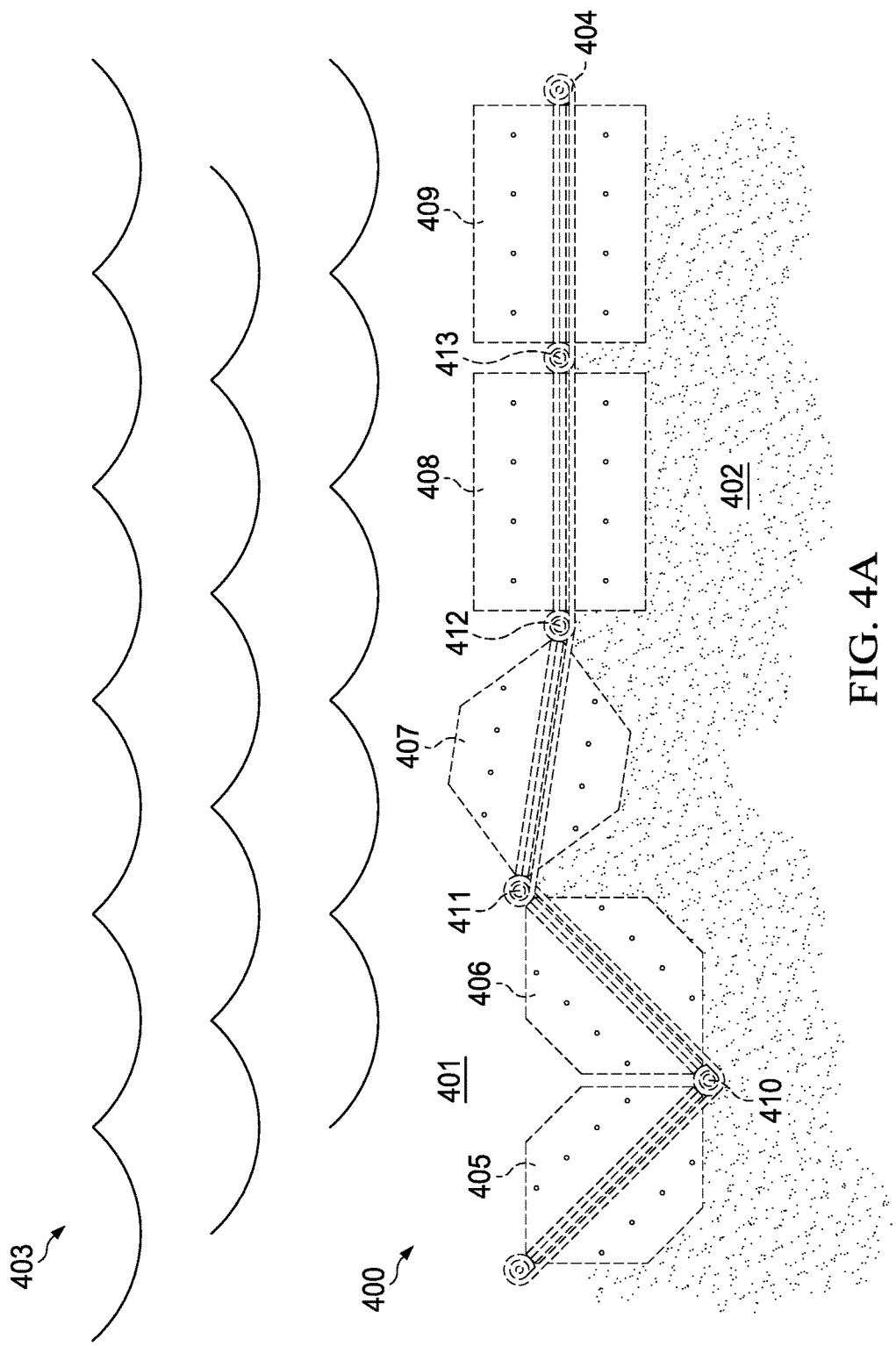
FIG. 4A shows a set of modular wave-breaks with a barrier in one embodiment.

Referring to FIG. 4A in another embodiment, a set of modular wave-breaks 400 is placed on water bottom surface 401 separating sediment area 402 from water mass 403. Set of modular wave-breaks 400 includes modular wave-breaks 405, 406, 407, 408, and 409 to form a singular wave-break system. Modular wave-breaks 405 and 406 are connected with connector pin 410. Modular wave-breaks 406 and 407 are connected with connector pin 411. Modular wave-breaks 407 and 408 are connected with connector pin 412. Modular wave-breaks 408 and 409 are connected with connector pin 413. Set of modular wave-breaks 400 are sealed with barrier 404 adjacent sediment area 402.

Figure 4B:
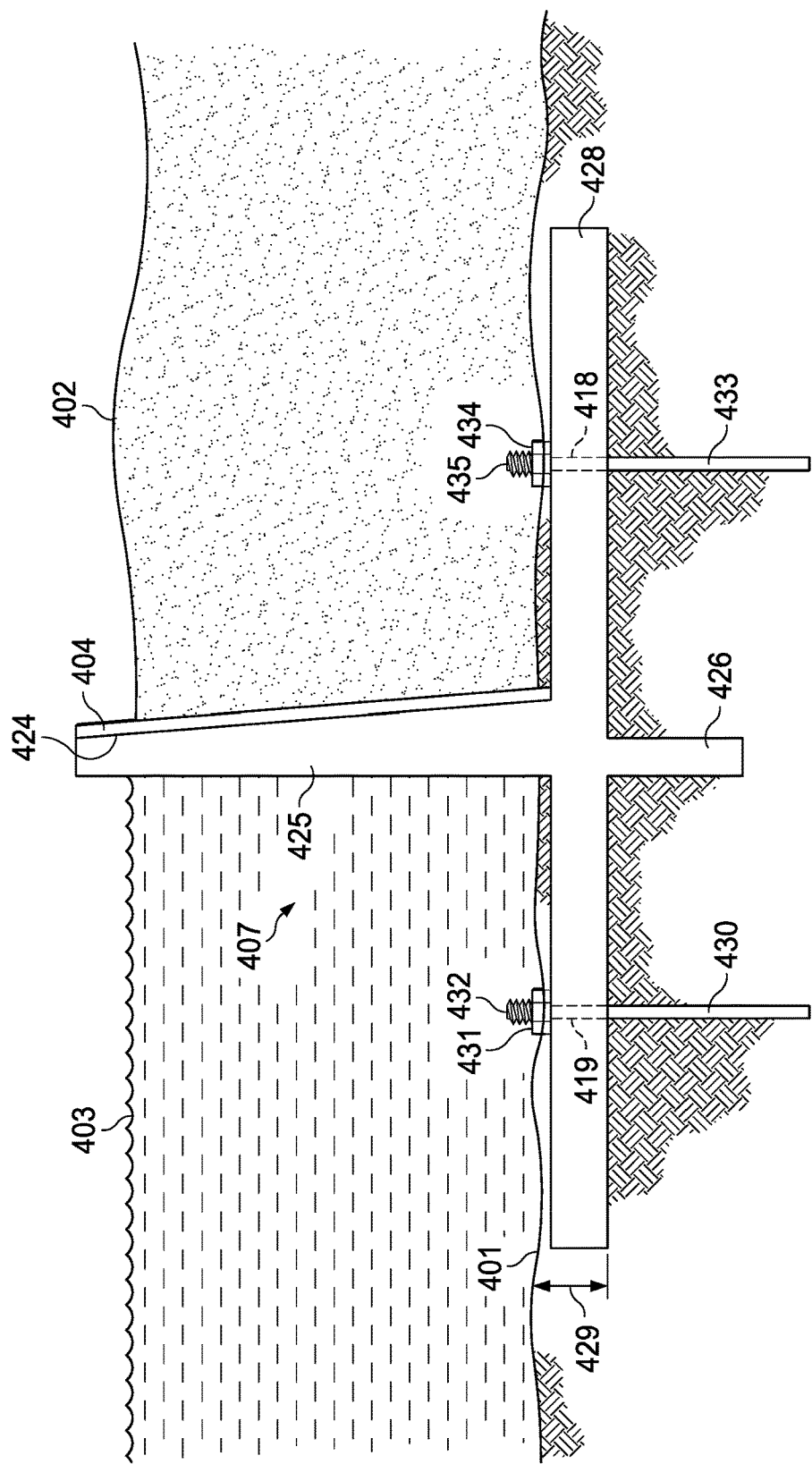
FIG. 4B is a side view of a modular wave-break anchored to a water bottom surface.

Referring to FIG. 4B by way of example, barrier 404 is adhered to rear surface 424 of wall 425. Anchor 426 of modular wave-break 407 is buried below water bottom surface 401. Wall 425 is above water bottom surface 401. Base 428 is buried immediately below water bottom surface 401 at depth 429.

In a preferred embodiment, depth 429 is approximately 1 foot. Other depths may be employed.

Mounting rod 430 is inserted through mounting hole 419 of base 428. Nut 431 is engaged with threaded portion 432 of mounting rod 430 to secure modular wave-break 407 to water bottom surface 401. Mounting rod 433 is inserted through mounting hole 418 of base 428. Nut 434 is engaged with threaded portion 435 of mounting rod 433 to secure modular wave-break 407 to water bottom surface 401.

In a preferred embodiment, barrier 404 is a geotechnical material adhered to the surfaces of modular wave-breaks 405, 406, 407, 408, and 409 with a mastic type adhesive which is also applied to seal the joints between each modular wave-break. In another embodiment, a polyurethane sealant may be used. Other sealants known in the art may be employed.

Figure 5A:
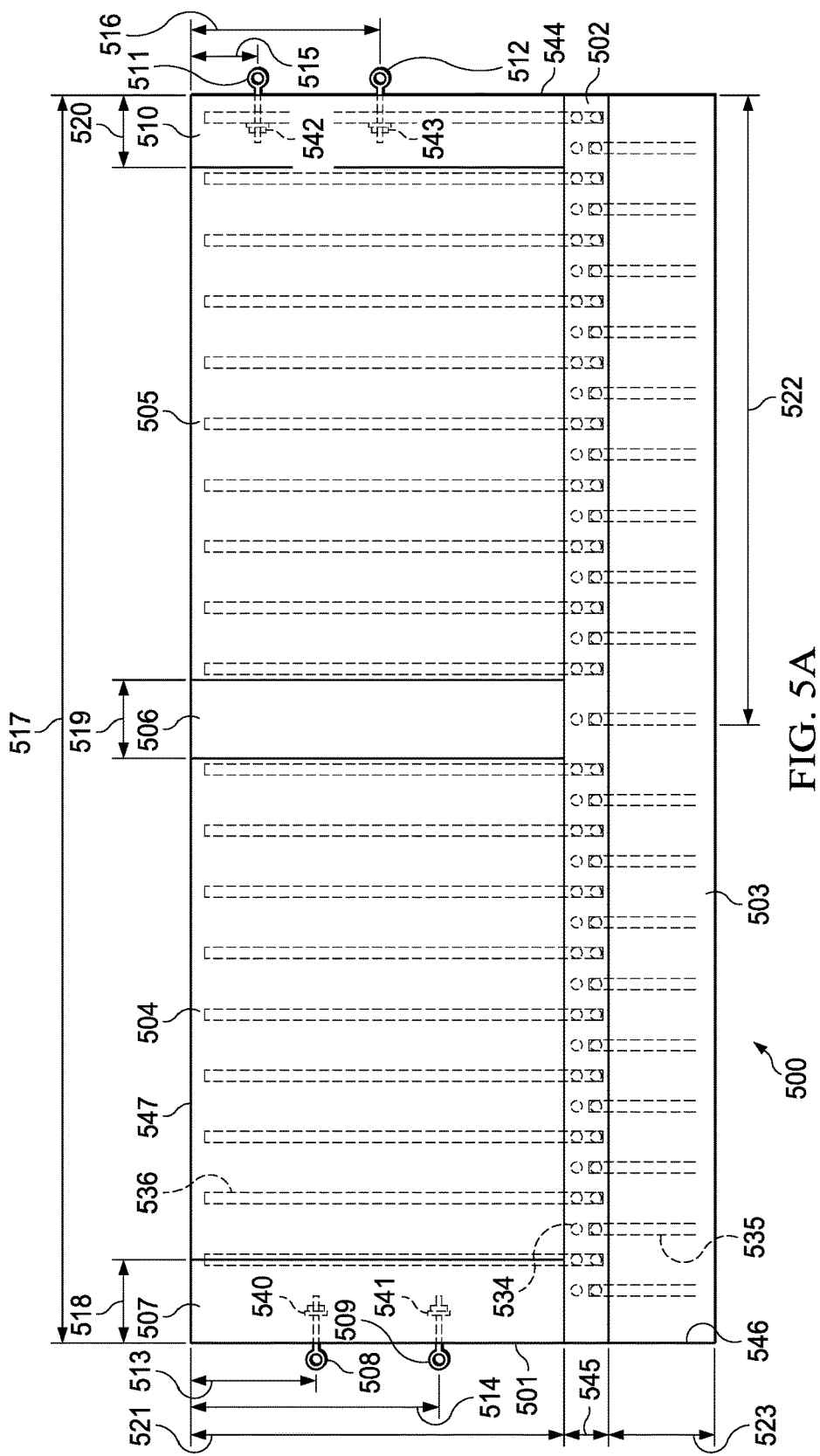
FIG. 5A is a front view a modular bulkhead of a preferred embodiment.

Referring to FIG. 5A in another embodiment, modular bulkhead 500 includes wall 501 attached to base 502. Base 502 is attached to anchor 503.

Wall 501 includes wall portions 504 and 505 separated by central portion 506. Side portion 507 is attached to wall portion 504 opposite central portion 506. Eye bolts 508 and 509 are connected to side portion 507 with nuts 540 and 541, respectively. Side portion 510 is attached to wall portion 505 opposite central portion 506. Eye bolts 511 and 512 are connected to side portion 510 with nuts 542 and 543, respectively.

Wall 501 has width 517 and height 521. Side portion 507 has width 518. Central portion 506 has width 519. Side portion 510 has width 520. Central portion 506 is distance 522 on center from side 544. Anchor 503 has height 523. Base 502 has thickness 545.

In a preferred embodiment, width 517 is approximately 20 feet. Other widths may be employed.

In a preferred embodiment, height 521 is approximately 6 feet. Other heights may be employed.

In a preferred embodiment, width 518 is approximately 1 foot. Other widths may be employed.

In a preferred embodiment, width 519 is approximately 1 foot. Other widths may be employed.

In a preferred embodiment, width 520 is approximately 1 foot. Other widths may be employed.

In a preferred embodiment, distance 522 is approximately 10 feet. Other distances may be employed.

In a preferred embodiment, height 523 is approximately 1 foot, 9 inches. Other heights may be employed.

In a preferred embodiment, thickness 545 is approximately 8 inches. Other thicknesses may be employed.

Eye bolt 508 is distance 513 from top edge 547 of wall 501. Eye bolt 509 is distance 514 from top edge 547 of wall 101. Eye bolt 511 is distance 515 from top edge 547 of wall 501. Eye bolt 512 is distance 516 from top edge 547 of wall 501.

In a preferred embodiment, distance 513 is approximately 2 feet. In this embodiment, distance 514 is approximately 4 feet. In this embodiment, distance 515 is approximately 1 foot. In this embodiment, distance 516 is approximately 3 feet. Hence, eye bolts 508 and 509 are staggered in distance from top edge 547 with respect to eye bolts 511 and 512 to enable a modular connection with multiple wave-breaks as will be further described below.

In a preferred embodiment, nuts 540, 541, 542, and 543 are embedded in vertical portion 101 with washers to provide pull out resistance.

In a preferred embodiment, each of eye bolts 508, 509, 511, and 512 has a set of dimensions of approximately 1¼ inches×10 inches. Other dimensions may be employed.

In a preferred embodiment, each of eye bolts 508, 509, 511, and 512 is screwed into nuts 540, 541, 542, and 543, respectively so that each of eye bolts 508, 509, 511, and 512 is open in the vertical direction.

Figure 5B:
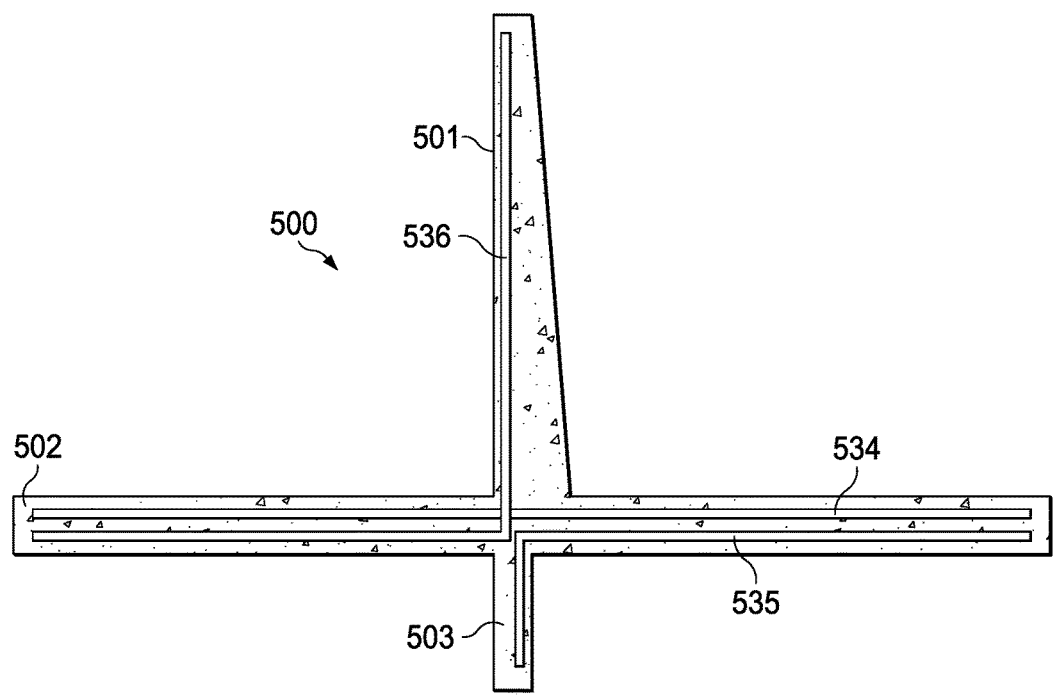
FIG. 5B is a cross-sectional view of reinforcing bar of a modular bulkhead of a preferred embodiment.

Referring to FIGS. 5A and 5B, modular bulkhead 500 includes structural bar 534 in base 502, structural bar 535 in base 502 and anchor 503, structural bar 536 in wall 501 and base 502.

Structural bars 534, 535, and 536 are embedded throughout modular bulkhead 500 across width 517. In a preferred embodiment, each horizontal structural bar 534 is placed 6 inches on center to reinforce base 502. In this embodiment, upper structural bar 536 is placed 12 inches on center at every other horizontal structural bar 534, and bent to provide reinforcement between wall 501 and base 502. In this embodiment, each lower structural bar 535 is placed 12 inches on center, at every other horizontal structural bar 534 not aligned with upper structural bars 536. Each lower structural bar 535 is bent to provide reinforcement between anchor 503 and base 502.

In a preferred embodiment, each of structural bars 534, 535, and 536 is no. 6 size, having a minimum of 60 ksi yield tensile strength and made of fiberglass. Other suitable materials known in the art may be employed.

In a preferred embodiment, wall 501, base 502, and anchor 503 are cast as a whole in 5,000 psi concrete having a unit weight of approximately 105 lb./cubic ft. and including structural bars 534, 535, and 536.

Figure 5C:
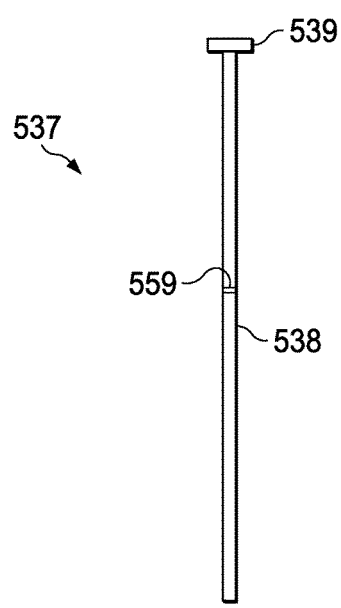
FIG. 5C is a side view of a connector pin for a modular bulkhead of a preferred embodiment.

Referring to FIG. 5C, connector pin 537 includes shaft 538 and head 539 attached to shaft 538. Shaft 538 includes hole 559. In use, connector pin 537 is inserted through a set of eyebolts to connect multiple modular bulkheads 500 and a bolt is inserted through hole 559 and secured with a nut to hold connector pin 537 in place when connecting multiple modular bulkheads as will be further described below.

In a preferred embodiment, connector pin 537, eye bolts 508, 509, 511, and 512, and nuts 540, 541, 542, and 543 are made of 316 stainless steel. Other suitable materials known in the art may be employed.

In another embodiment, a set of stainless steel cables can be employed to secure multiple modular bulkheads together by stringing the steel cables through the eyebolts. The set of stainless steel cables would preferably be placed on the load bearing side to facilitate additional structural integrity and system stability.

Figure 5D:
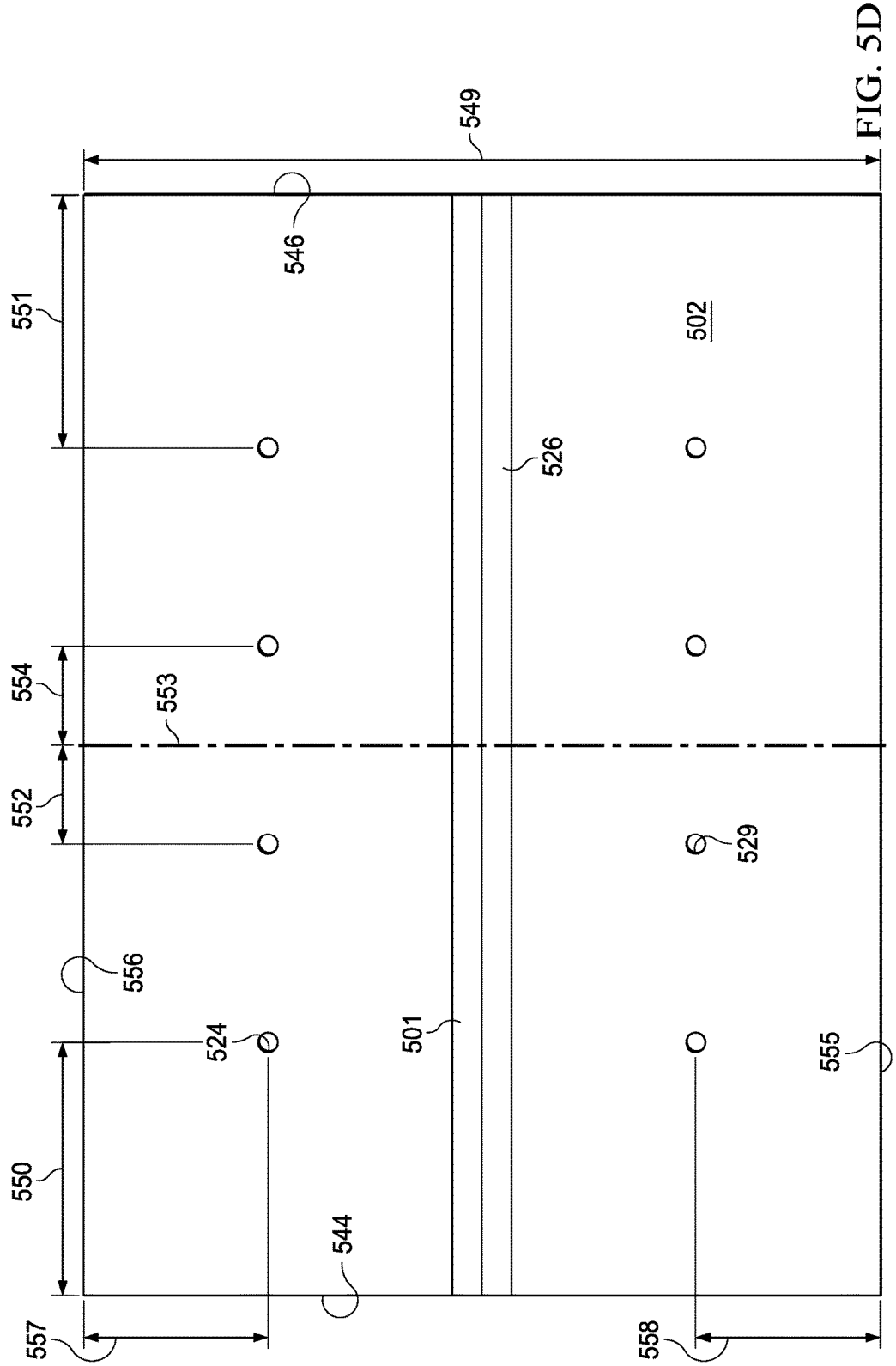
FIG. 5D is a top view of one embodiment of a modular bulkhead.

Referring to FIG. 5D in one embodiment, base 502 has sets of mounting holes 524 and 529, sides 544, 546, 555, and 556, and length 549. Sets of mounting holes 524 and 529 provide lift points for installing and/or moving modular bulkhead 500 and provide additional mounting support for mounting a modular wave-break to a structure as will be described below.

Set of mounting holes 524 is located distance 550 from side 544, distance 551 from side 546, distance 552 from center line 553, distance 554 from center line 553, and distance 557 from side 556.

Set of mounting holes 529 is located distance 550 from side 544, distance 551 from side 546, distance 552 from center line 553, distance 554 from center line 553, and distance 558 from side 555.

In a preferred embodiment, length 549 is approximately 12 feet. Other lengths may be employed.

In a preferred embodiment, each of distances 550 and 551 is approximately 2 feet, four inches. Other distances may be employed.

In a preferred embodiment, each of distances 552 and 554 is approximately 2 feet, four inches. Other distances may be employed.

In a preferred embodiment, each of distances 557 and 558 is approximately 2 feet, 6 inches. Other distances may be employed.

Figure 5E:
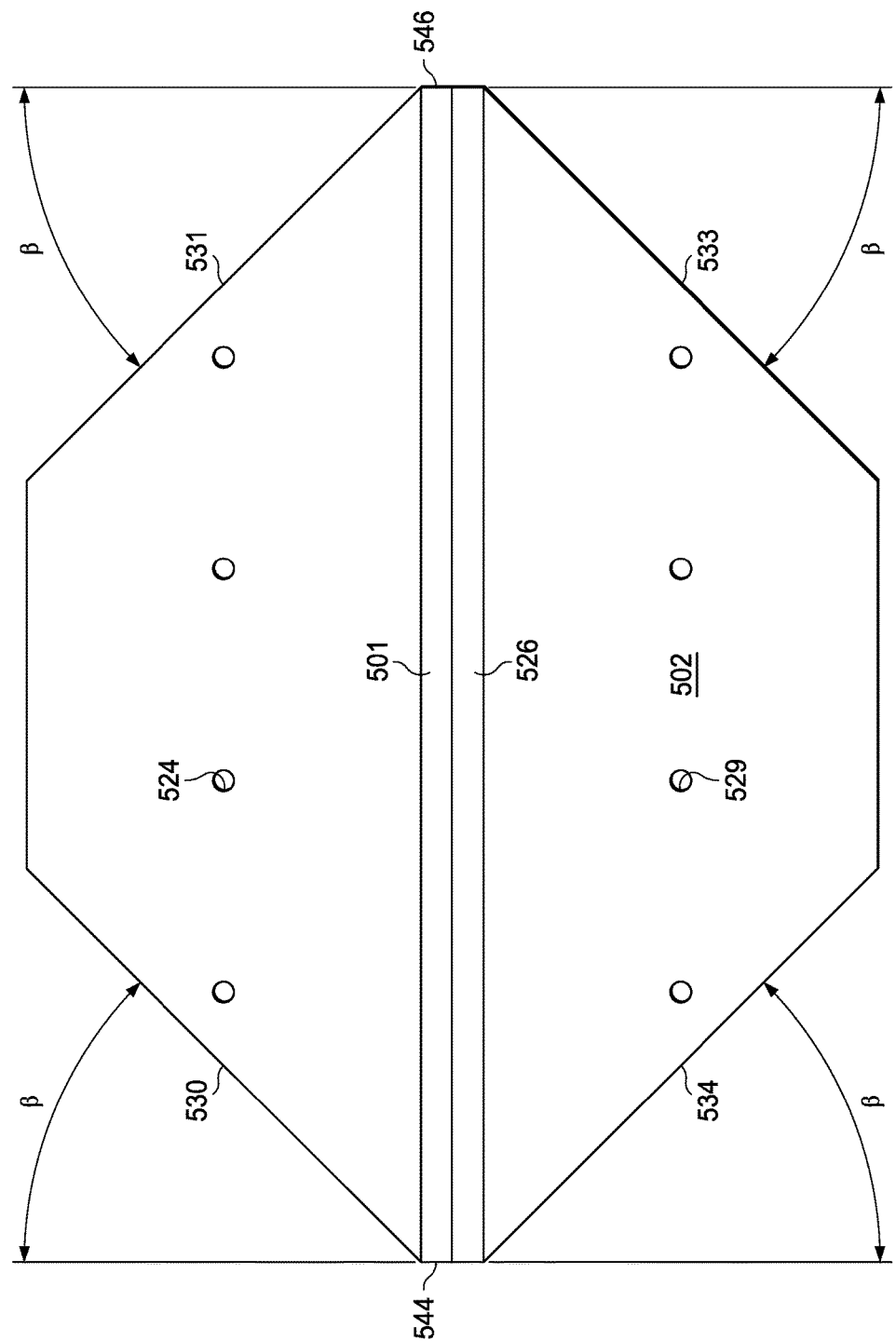
FIG. 5E is a top view of another embodiment of a modular bulkhead.

Referring to FIG. 5E in another embodiment, base 502 has tapered sides 530, 531, 533, and 534. Each of tapered sides 530 and 534 tapers at angle β off-set from side 544 and each of tapered sides 531 and 533 tapers at angle β off-set from side 546.

In a preferred embodiment, angle β is approximately 30 degrees. In another embodiment, angle β is approximately 15 degrees. In another embodiment, angle β is approximately 45 degrees. Other angles may be employed.

In other embodiments, each of tapered sides 530, 531, 533, and 534 tapers at various angles from its respective side according to design need.

Figure 5F:
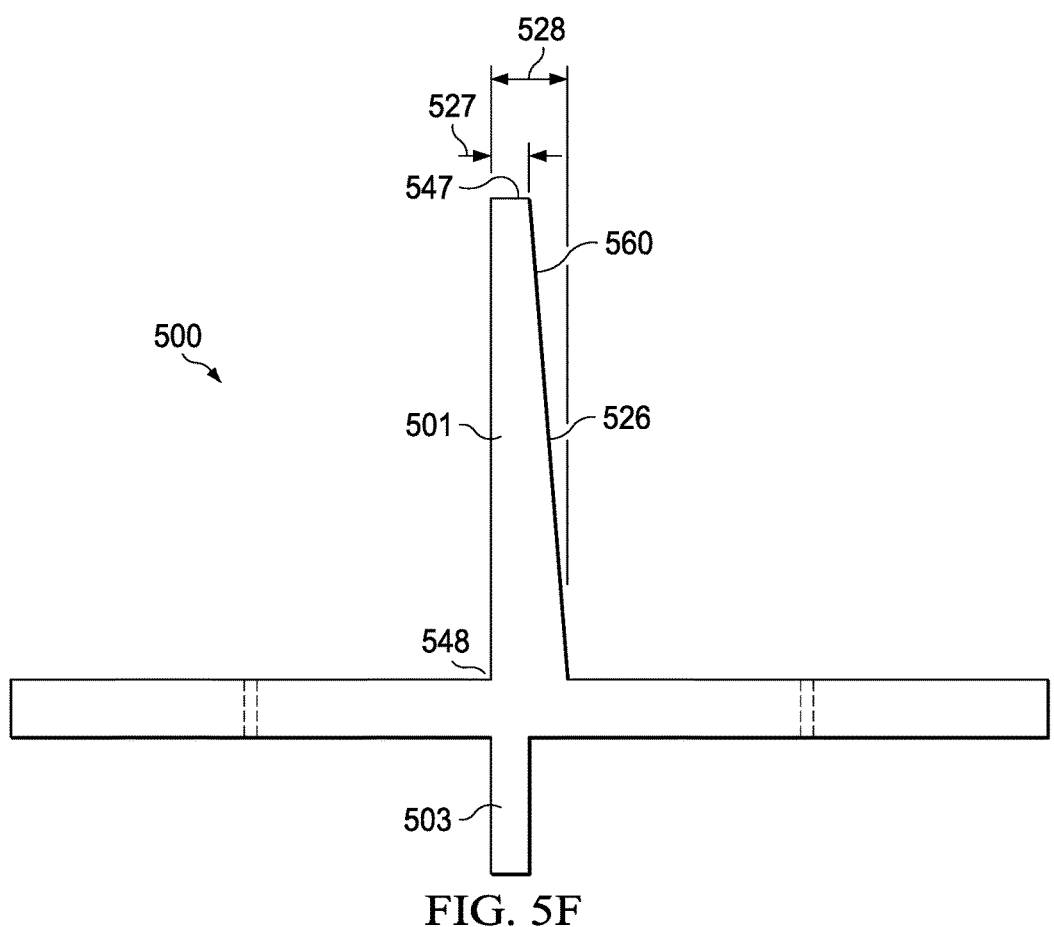
FIG. 5F is a side view of one embodiment of a modular bulkhead.

Referring to FIG. 5F in one embodiment, rear surface 560 of wall 501 includes taper 526. Taper 526 tapers from thickness 527 at top edge 547 to thickness 528 at bottom 548 of wall 501. Taper 526 is included for additional load support and is placed toward the land side as will be further described below. Anchor has thickness 527.

In a preferred embodiment, thickness 527 is approximately 6 inches. Other thicknesses may be employed.

In a preferred embodiment, thickness 528 is approximately 1 foot. Other thicknesses may be employed.

Figure 5G:
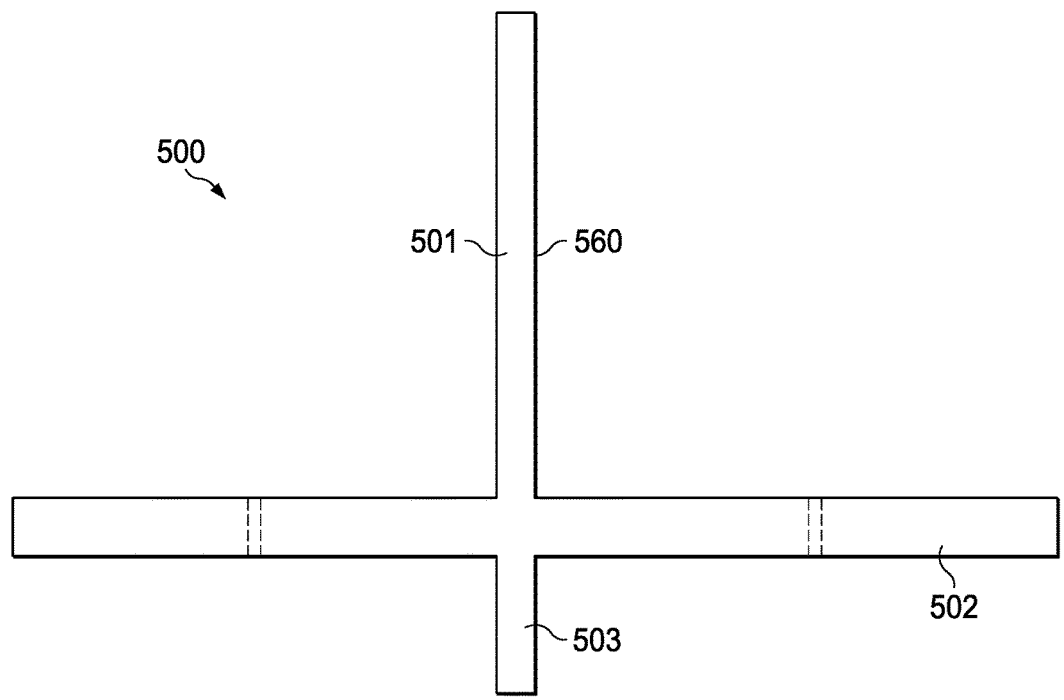
FIG. 5G is a side view of one embodiment of a modular bulkhead.

Referring to FIG. 5G in another embodiment, rear surface 560 of wall 501 is generally perpendicular to base 502, without taper 526.

Figure 5H:
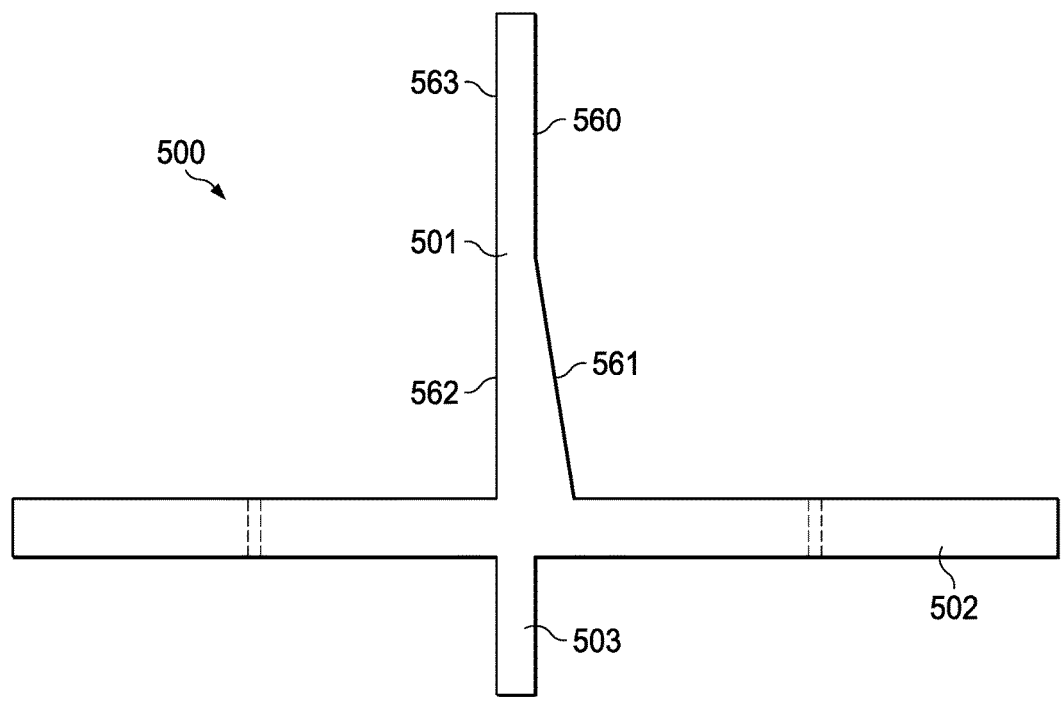
FIG. 5H is a side view of one embodiment of a modular bulkhead.

Referring to FIG. 5H in another embodiment, rear surface 560 includes taper 561. Taper 561 does not cover the entire rear surface 560 of the wall 501. In this embodiment, lower half 562 of wall 501 has taper 561 and upper half 563 is generally perpendicular to base 502.

Other variations are possible. For example, wall 501 can be trapezoidal or form a parallelogram in shape with tapers on both sides.

Figure 6:
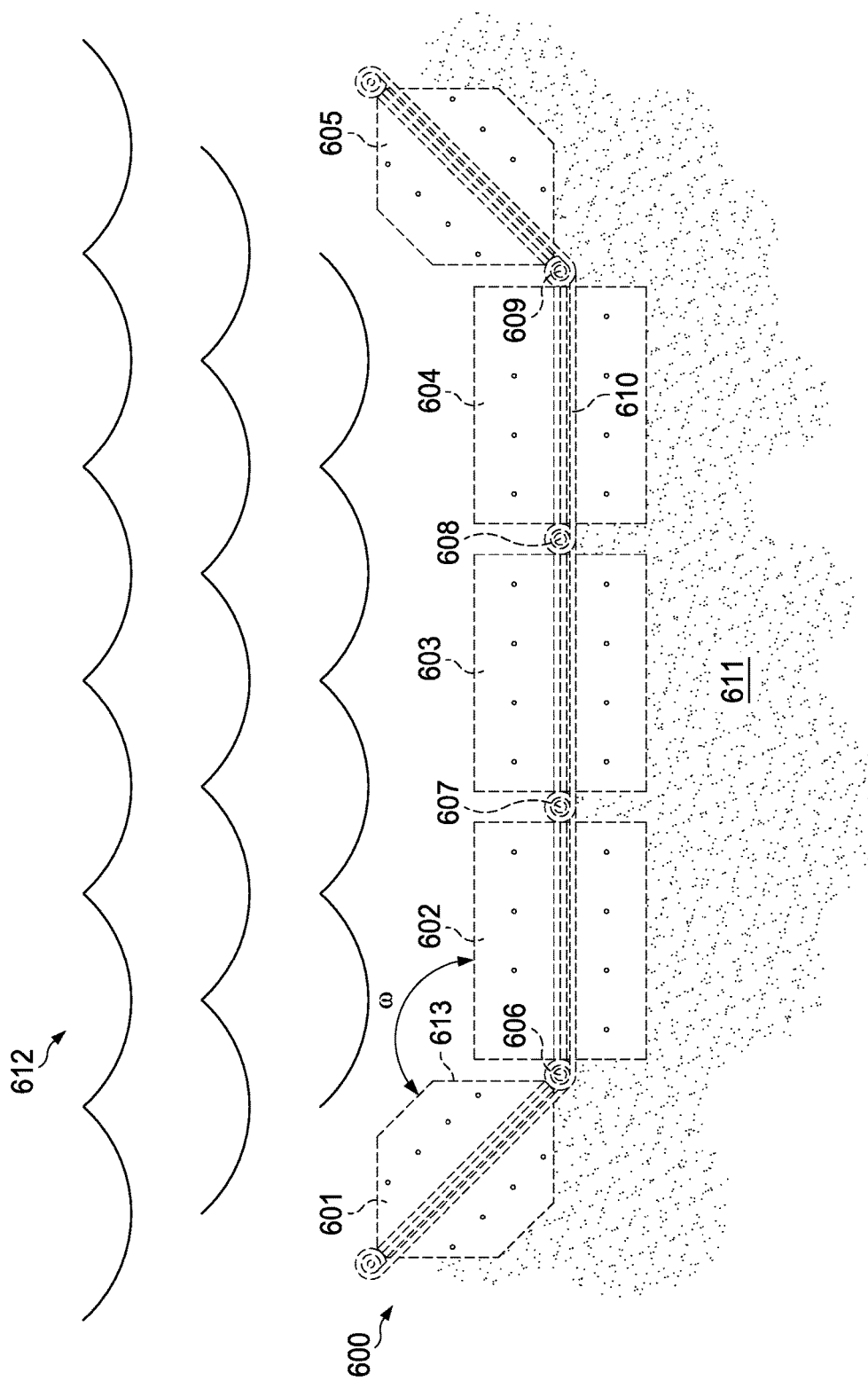
FIG. 6 shows a deployment of a set of modular bulkheads to contain a sediment field.

Referring to FIG. 6, set of modular bulkheads 600 forms a containment wall separating sediment area 611 from water mass 612. Set of modular bulkheads 600 includes modular bulkheads 601, 602, 603, 604, and 605. Modular bulkheads 601 and 602 are connected with connector pin 606, modular bulkheads 602 and 603 are connected with connector pin 607, modular bulkheads 603 and 604 are connected with connector pin 608, and modular bulkheads 604 and 605 are connected with connector pin 609. Set of modular bulkheads 600 are sealed with barrier 610 adjacent sediment area 611. Set of modular bulkheads 600 are secured the surface in the same manner as described in FIG. 4B.

By way of example, modular bulkhead 601 has tapered side 613. Tapered side 613 enables modular bulkhead 601 to be positioned off-set at angle ω from modular bulkhead 602 and enabling set of modular bulkheads 600 to be positioned at any desirable configuration.

In a preferred embodiment, angle ω is a range from approximately 0° to approximately 180°.

In a preferred embodiment, barrier 610 is a geotechnical material adhered to the surfaces of modular bulkheads 601, 602, 603, 604, and 605 with a mastic type adhesive which is also applied to seal the joints between each modular wave-break. In another embodiment, a polyurethane sealant may be used. Other sealants known in the art may be employed.

Figure 7A:
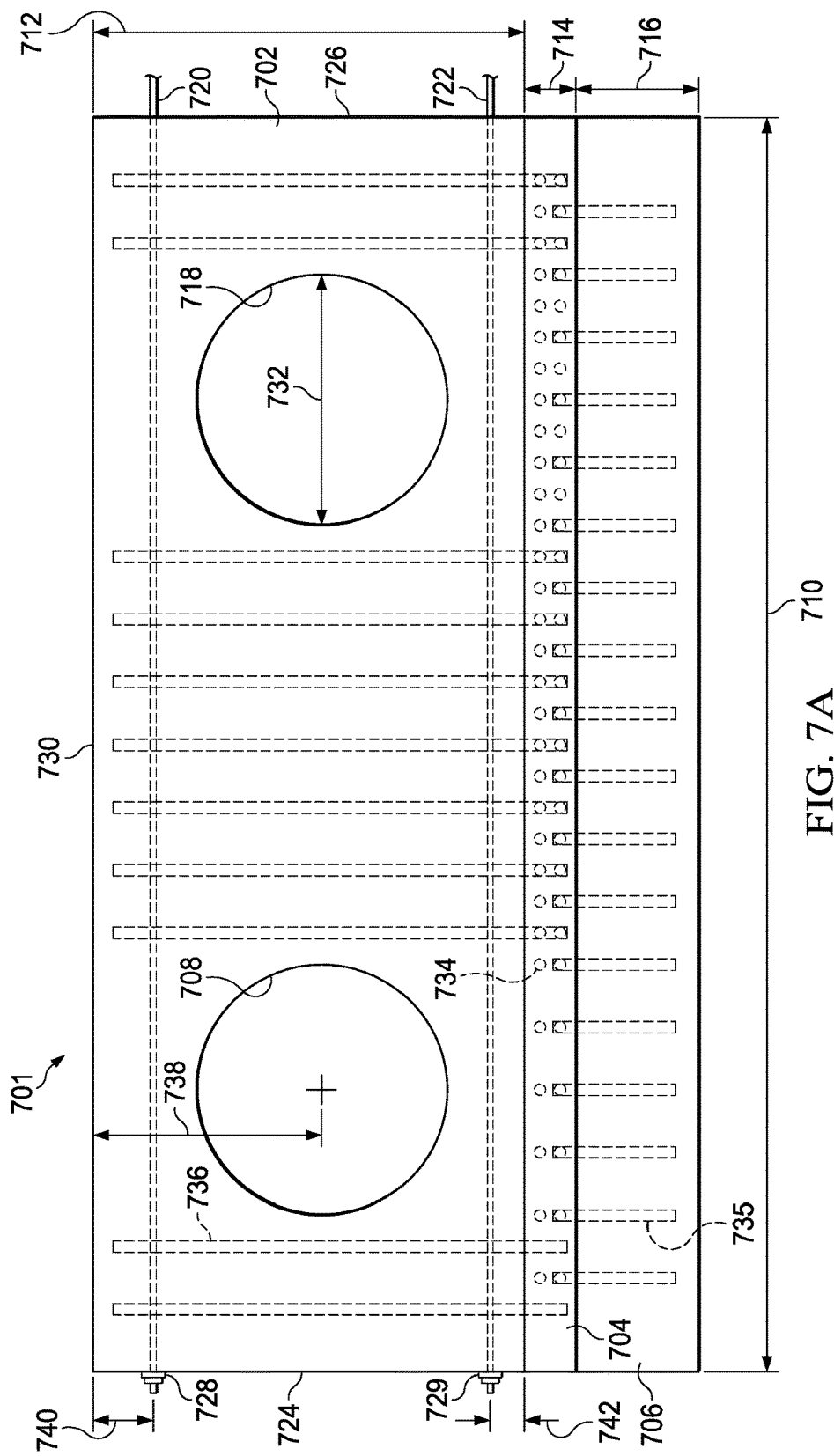
FIG. 7A is a front view of a water control structure panel of a preferred embodiment.

Referring to FIG. 7A in another embodiment, panel 701 includes wall 702 integrally formed with base 704. Anchor 706 extends from base 704. Wall 702 includes flow holes 708 and 718. Flow holes 708 and 718 allow water to pass through panel 701. In a preferred embodiment, flow holes 708 and 718 are circular, however, other shapes may be employed. The number of flow holes incorporated into wall 702 may vary from at least one to as many as will not affect the structural integrity of panel 701. Post-tensioning reinforcement cables 720 and 722 extend through the width of wall 702. At side 724 of wall 702, caps 728 and 729 terminate cables 720 and 722, respectively. Caps 728 and 729 provide resistance for applying tension to cables 720 and 722. Panel 701 connects to an adjacent panel at side 726 as will be further described below. Cables 720 and 722 extend to adjacent panels to create a water control structure comprised of multiple panels connected in series.

Wall 702 has width 710 and height 712. Base 704 has width 710 and height 714. Anchor 706 has width 710 and height 716. Flow holes 708 and 718 have diameter 732. The center points of flow holes 708 and 718 are located distance 738 from top edge 730. Cable 720 is positioned distance 740 from top edge 730 and cable 722 is positioned distance 742 from base 704. Preferably holes 708 and 718 are located between cables 720 and 722.

In a preferred embodiment, width 710 is approximately 20 feet. Other widths may be employed.

In a preferred embodiment, height 712 is approximately 6 feet. Other heights may be employed.

In a preferred embodiment, height 714 is approximately 8 inches. Other heights may be employed.

In a preferred embodiment, height 716 is approximately 1 foot, 9 inches. Other heights may be employed.

In a preferred embodiment, diameter 732 is approximately 3 feet. Other diameters may be employed.

In a preferred embodiment, distance 738 is approximately 3 feet. Other distances may be employed.

In a preferred embodiment, distances 740 and 742 are approximately 8 inches. Other distances may be employed.

Referring to FIGS. 7A and 7B, panel 701 may include structural bar 734 in base 704, structural bar 735 in base 704 and anchor 706, and structural bar 736 in wall 702 and base 704.

Structural bars 734, 735, and 736 may be embedded throughout panel 701 across width 710. In a preferred embodiment, each horizontal structural bar 734 is placed 6 inches from each other to reinforce base 704. In this embodiment, each upper structural bar 736 is placed 12 inches from each other at every other horizontal structural bar 734, and bent to provide reinforcement between wall 702 and base 704. Upper structural bars 736 do not cross flow holes 708 and 718. In this embodiment, each lower structural bar 735 is placed 12 inches from each other, at every other horizontal structural bar 734 not aligned with upper structural bars 736. Lower structural bars 735 are offset between upper structural bars 736. Each lower structural bar 735 is bent to provide reinforcement between base 704 and anchor 706.

In a preferred embodiment, each of structural bars 734, 735, and 736 is no. 6 size, having a minimum of 60 ksi yield tensile strength and made of fiberglass. Other suitable materials such as reinforcing fibers known in the art may be employed.

In a preferred embodiment, wall 702, base 704, and anchor 706 are cast as a whole in 5,000 psi concrete having a unit weight of approximately 105 lb./cubic ft. and may include structural bars 734, 735, and 736.

Figure 7C:
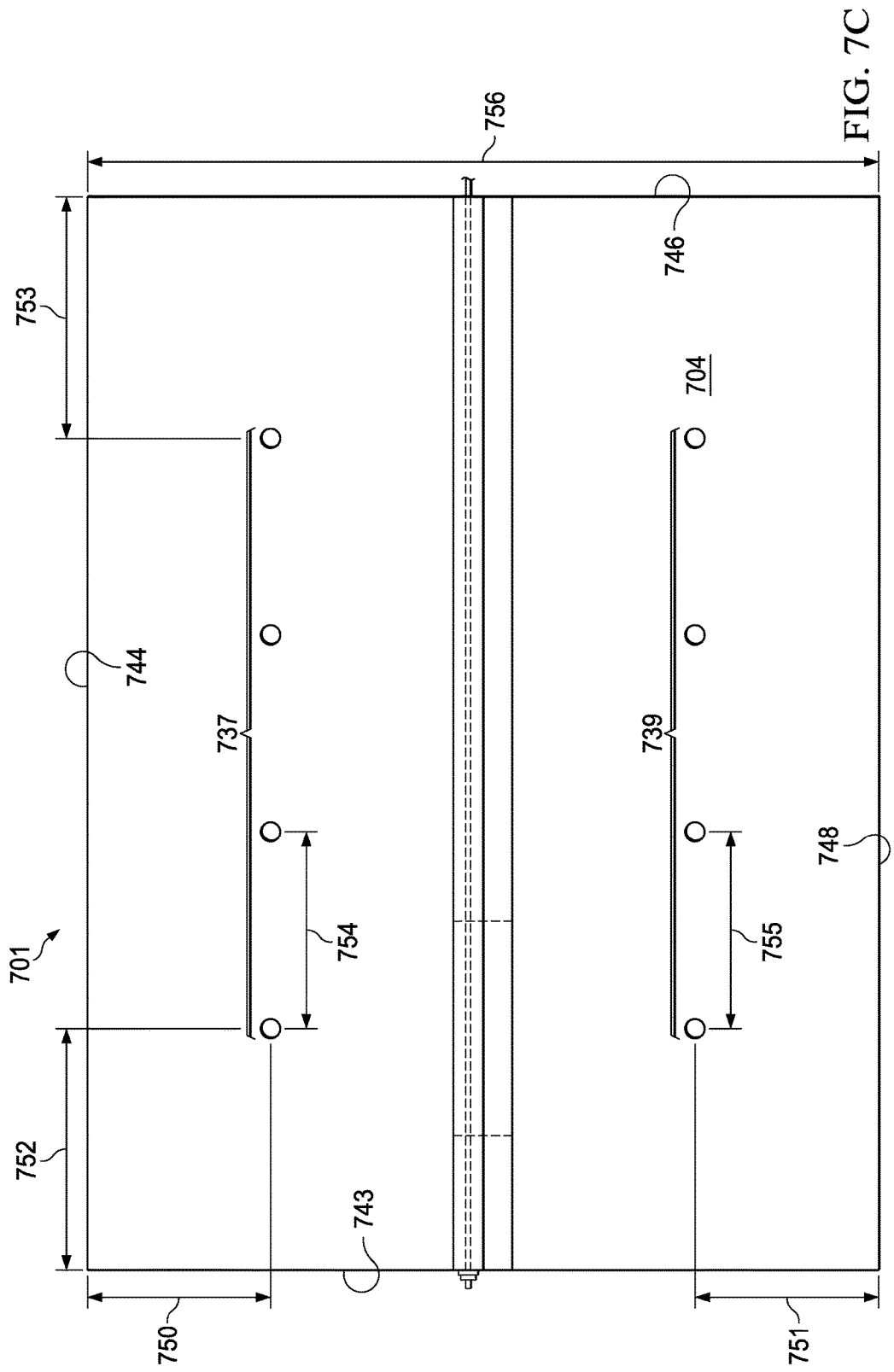
FIG. 7C is a top view of a water control structure panel of a preferred embodiment.

Referring to FIG. 7C in one embodiment, base 704 has sets of mounting holes 737 and 739, sides 743, 744, 746, and 748, and length 756. Sets of mounting holes 737 and 739 provide lift points for installing and/or moving panel 701 and provide additional mounting support for mounting panel 701 to a structure as will be described below.

Set of mounting holes 737 is located distance 752 from side 743, distance 753 from side 746, and distance 750 from side 744. Each hole of set of mounting holes 737 is spaced distance 754 from an adjacent hole.

Set of mounting holes 739 is located distance 752 from side 743, distance 753 from side 746, and distance 751 from side 748. Each hole of set of mounting holes 739 is spaced distance 755 from an adjacent hole.

In a preferred embodiment, length 756 is approximately 12 feet. Other lengths may be employed.

In a preferred embodiment, each of distances 750 and 751 is approximately 2 feet, 6 inches. Other distances may be employed.

In a preferred embodiment, each of distances 752 and 753 is approximately 2 feet, four inches. Other distances may be employed.

In a preferred embodiment, each of distances 754 and 755 is approximately 4 feet. Other distances may be employed.

Figure 8A:
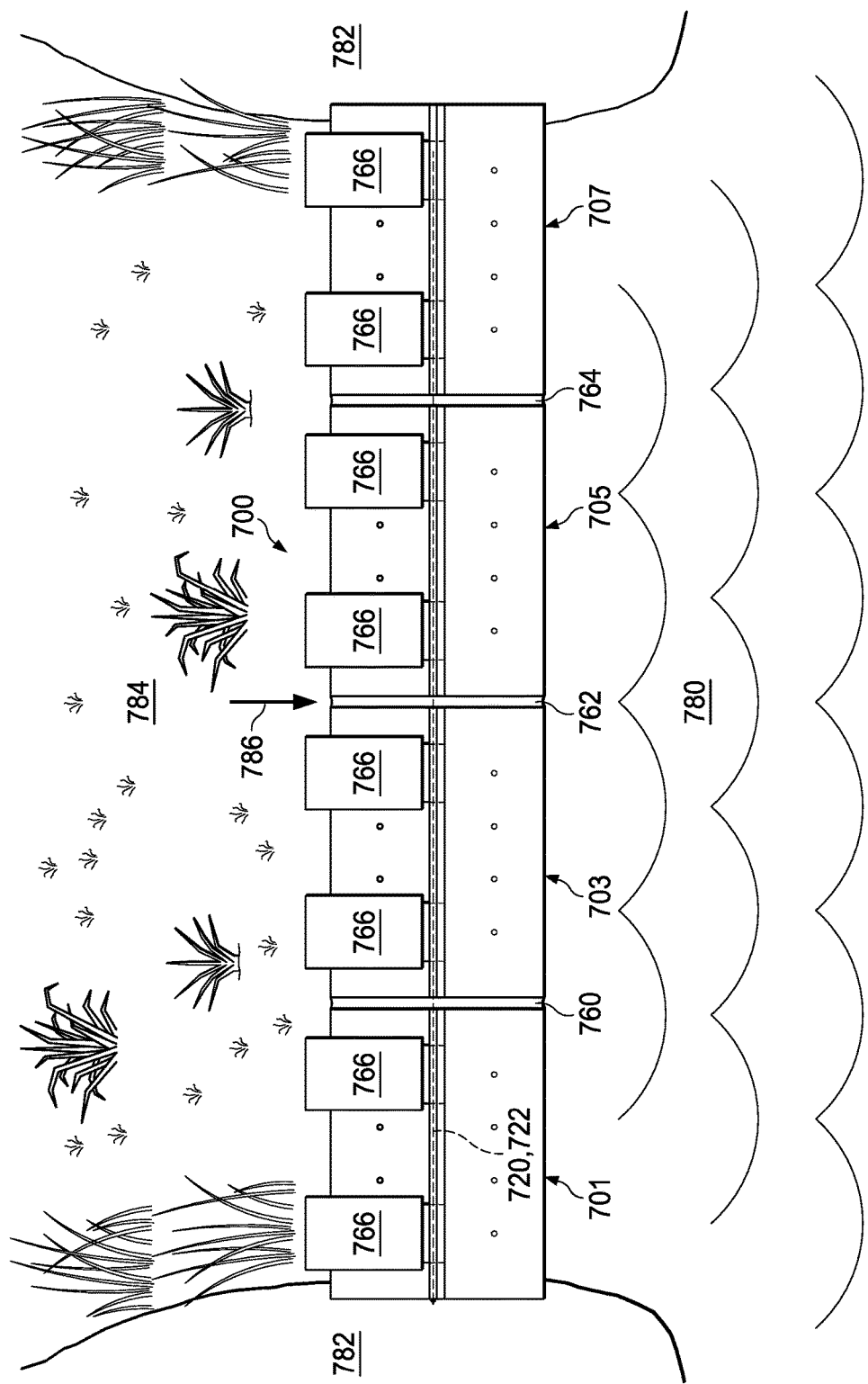
FIG. 8A shows a deployment of a water control structure adjacent a wetland.

Referring to FIG. 8A, water control structure 700 includes panels 701, 703, 705, and 707. Panels 701, 703, 705, and 707 are connected to each other in series with post-tensioning reinforcement cables 720 and 722. Between panels 701 and 703 is barrier 760. Between panels 703 and 705 is barrier 762. Between panels 705 and 707 is barrier 764. Barriers 760, 762, and 764 are a gasket sealant material adhered to the panels with a mastic type adhesive to seal the joints between each panel. An example is RAM-NEK® Preformed Flexible Plastic Gaskets available from Henry Corporation. The combination of the post-tensioning reinforcement cables and the barriers lock panels 701, 703, 705, and 707 together and ensure water tightness. Water control structure 700 is used to control the hydraulic regime and water budget of a wetland area. The wetland area may be designed for flood conveyance and requires the functionality to store and release storm runoff The water control structure can maintain proper water depth in the wetland area for specific habitat needs and can facilitate a total drawdown of the wetland area if necessary.

Panels 701, 703, 705, and 707 each include weir boxes 766. A weir box 766 is connected to each flow hole of each panel. Weir boxes are commonly used to alter the flow of rivers and canals to prevent flooding, measure discharge, and help render water ways navigable. In an alternate embodiment, water structure 700 does not include any weir boxes.

Outflow of water from wetland area 784 adjacent levee 782 is managed by water control structure 700 which controls the inflow of water in direction 786 into canal 780.

Panels 701, 703, 705, and 707 are pre-cast and transported to the wetland area for installation. The panels are post-tensioned on site prior to backfill of levee 782.

Figure 8B:
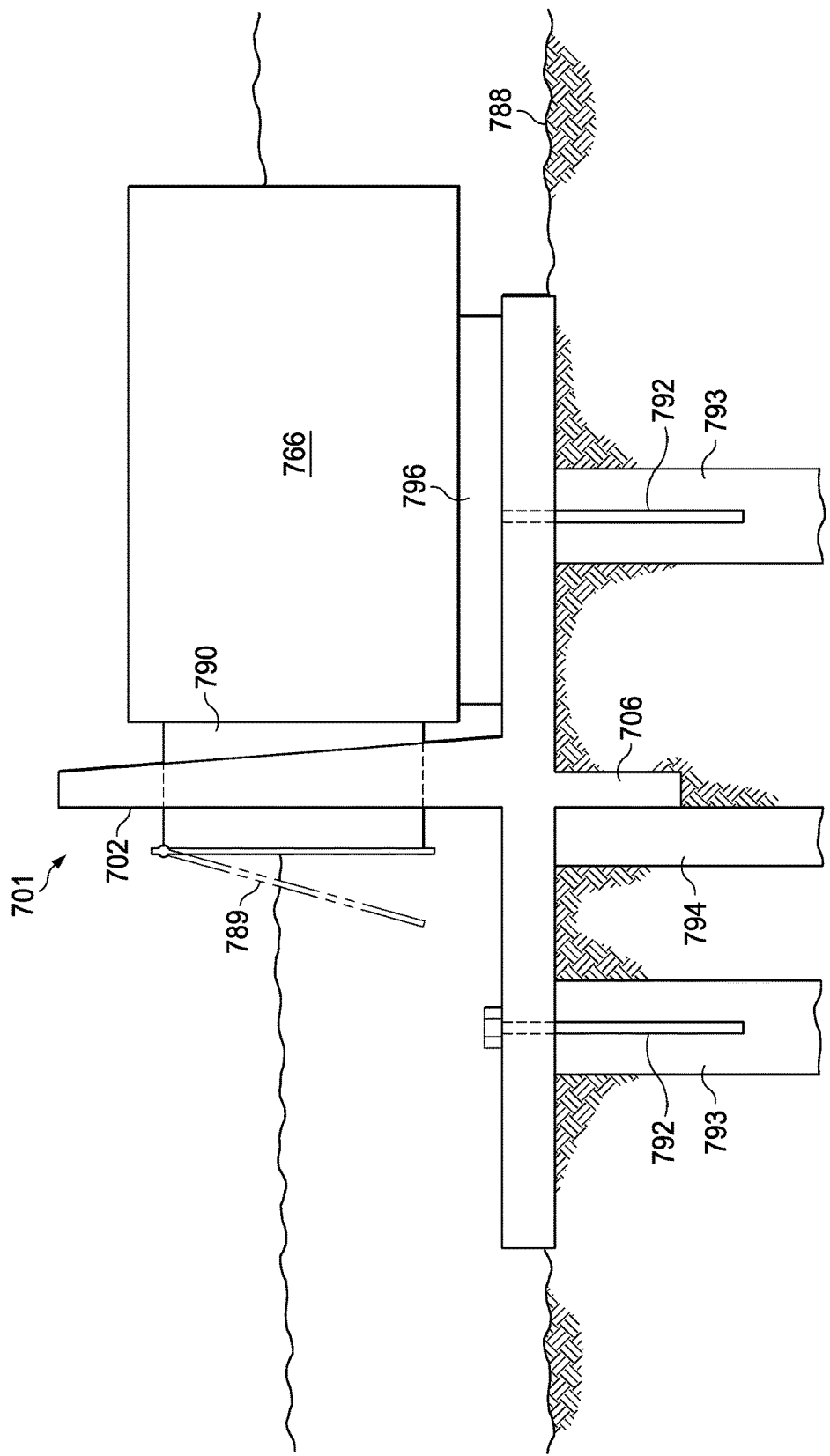
FIG. 8B is a side view of a water control structure panel anchored to a surface.

Referring to FIG. 8B by way of example, timber piles 793 and sheet pile 794 are driven into water bottom surface 788. Anchor 706 is buried below water bottom surface 788 adjacent sheet pile 794. A gasket sealant material may be adhered to the underside of base 704 and to anchor 706. Wall 702 is above water bottom surface 788.

Weir box 766 is connected to wall 702 with conduit 790. Conduit 790 extends from weir box 766 through a flow hole. Conduit 790 is grouted to or mastic sealed to the flow hole. Flap gate 789 is attached to conduit 790. Weir box 766 rests on foundation 796. The height of foundation 796 can be varied to ensure alignment of conduit 790 with a flow hole of wall 702. Anchor bolts 792 pass through holes 737 and 739 of base 704 and secure panel 701 to timber piles 793. Anchor bolts are typically 1 inch×36 inch lag screws. Other size anchor bolts may be employed.

Figure 9A:
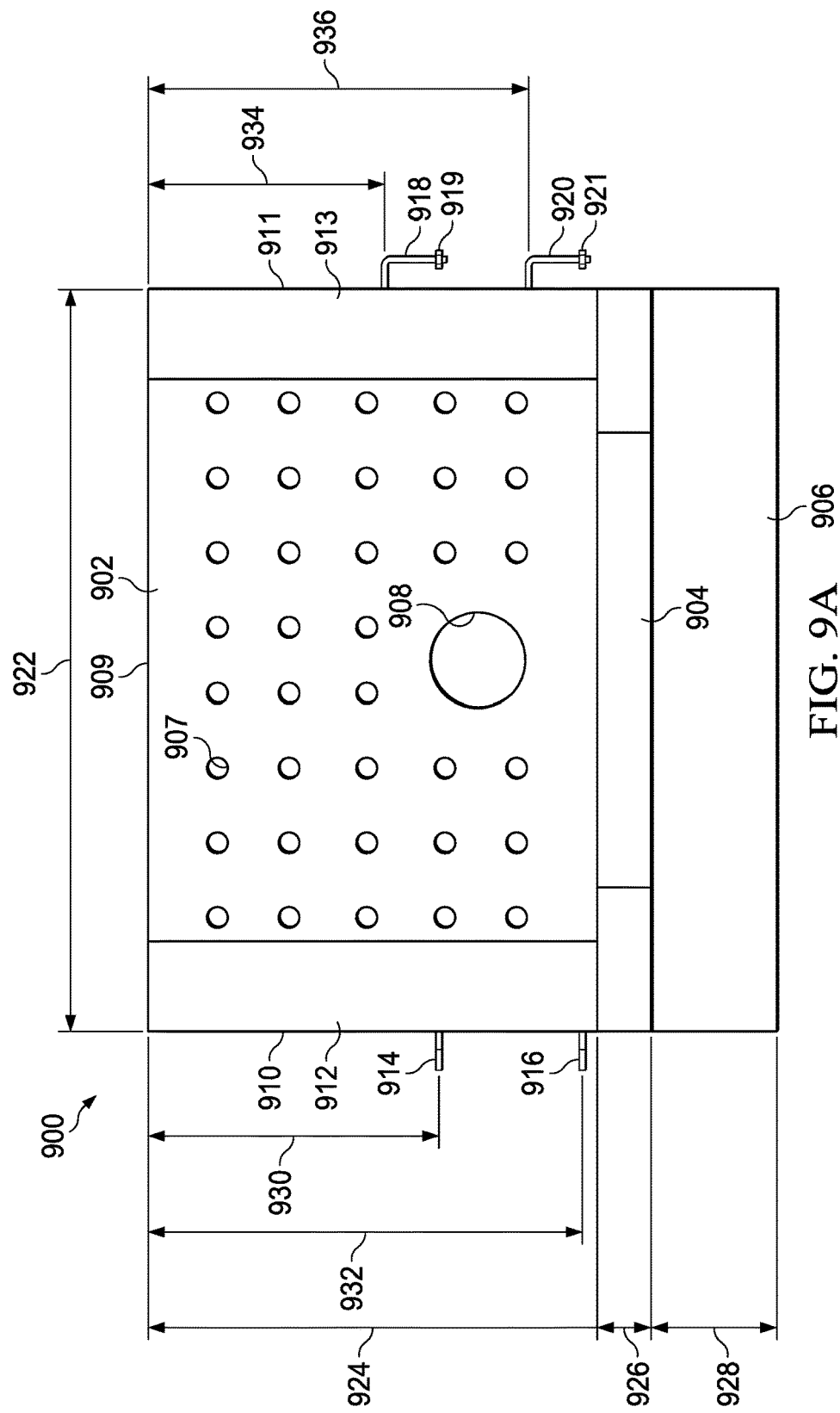
FIG. 9A is a front view of a low-energy modular wave-break of a preferred embodiment.

Referring to FIG. 9A, in another embodiment, modular wave-break 900 includes wall 902 attached to base 904. Base 904 is attached to anchor 906. Wall 902, base 904, and anchor 906 are cast as a whole in 5,500 psi, fiber reinforced, precast concrete having a unit weight of ranging from 14,100 lbs. in lightweight aggregate to 17,610 lbs. in normal aggregate.

Wall 902 includes set of dissipating holes 907 and passage hole 908. Set of dissipating holes 907 dissipate incoming waves and passage hole 908 allow sea creatures to move through modular wave break 900.

In a preferred embodiment, set of dissipating holes 907 is arranged in a grid-like pattern. Other geometric or non-geometric patterns may be employed.

In other embodiments, the number and configuration of set of dissipating holes 907 vary depending on the strength of waves that will be dissipated. In other embodiments, the number and configuration of passage holes 908 vary depending on the sea creatures in the location where modular wave-break 900 will be deployed.

In a preferred embodiment, each dissipating hole in set of dissipating holes 907 is approximately 3 inches in diameter. Other diameters may be utilized. In a preferred embodiment, passage hole 908 has a diameter of approximately 1 foot, six inches. Other diameters may be utilized.

Wall 902 has top edge 909 and lateral sides 910 and 911. Wall 902 includes rib 912 and rib 913 positioned adjacent lateral sides 910 and 911, respectively. Ribs 912 and 913 increase in thickness as each extends from top edge 909 towards base 904. Ribs 912 and 913 provide structural support for wall 902. In an alternate embodiment, wall 902 includes greater or lesser number of ribs which can be positioned distant from or proximate to the lateral sides. Eye bolts 914 and 916 extend from lateral side 910. Hooks 918 and 920 extend from lateral side 911. The eye of each eyebolt is sized to receive a hook. In an alternate embodiment, hooks 918 and 920 include nut 919 and nut 921, respectively.

Wall 902 has width 922 and height 924. Base 904 has thickness 926. Anchor 906 has height 928.

In a preferred embodiment, width 922 is approximately 10 feet. Other widths may be employed.

In a preferred embodiment, height 925 is approximately 6 feet. Other heights may be employed.

In a preferred embodiment, thickness 926 is approximately 9 inches. Other thicknesses may be employed.

In a preferred embodiment, height 928 is approximately 1 foot, 9 inches. Other heights may be employed.

In a preferred embodiment, eye bolt 914 is distance 930 from top edge 909 of wall 902. Eye bolt 916 is distance 932 from top edge 909 of wall 902. Hook 918 is distance 934 from top edge 909 of wall 902. Hook 920 is distance 936 from top edge 909 of wall 902.

In a preferred embodiment, distance 930 is approximately 3 feet, 6 inches; distance 932 is approximately 5 feet, 6 inches; distance 934 is approximately 3 feet; and distance 936 is approximately 5 feet. Hence, eye bolts 914 and 916 are staggered in distance from top edge 909 with respect to hooks 918 and 920 to enable a modular connection with multiple wave-breaks as will be further described below. Other connection systems known in the art may be employed. All the eyebolts are positioned such that they are open in the vertical direction enabling the eyebolts to receive the hooks.

Figure 9B:
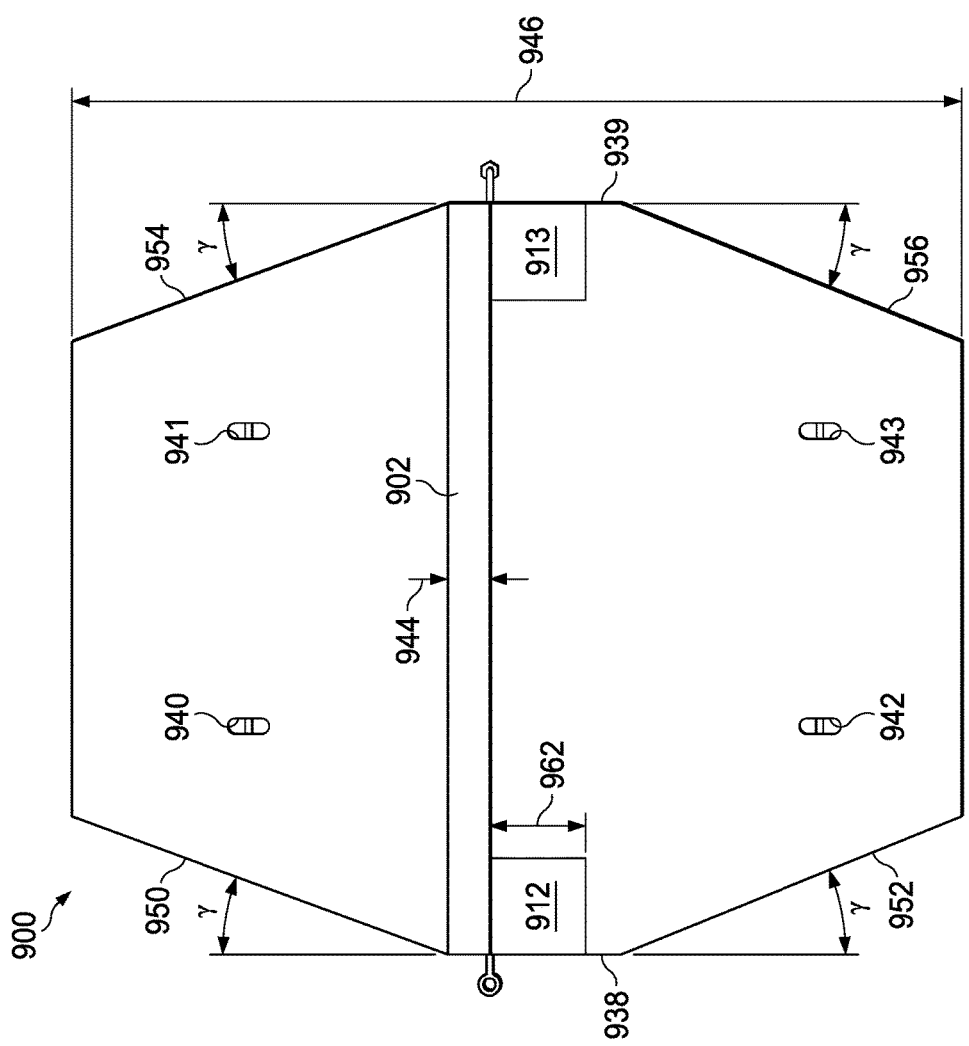
FIG. 9B is a top view of one embodiment of a low-energy modular wave-break.

Referring to FIG. 9B, wall 902 has depth 944. Base 904 has sides 938 and 939 and depth 946. Base 904 has lifting anchors 940, 941, 942, and 943 that provide lift points for installing and/or moving modular wave-break 900. Base 904 has tapered sides 950, 952, 954, and 956. Each of tapered sides 950 and 952 tapers at angle γ off-set from side 938 and each of tapered sides 954 and 956 tapers at angle γ off-set from side 939. In other embodiments, each of tapered sides 950, 952, 954, and 956 tapers at a different angle off-set from its respective side with respect to each other.

In a preferred embodiment, depth 944 is approximately 6 inches. Other depths may be employed. Depth 946 is approximately 12 feet. Other depths may be employed. In a preferred embodiment, angle γ is approximately 30 degrees. In another embodiment, angle γ is approximately 15 degrees. In another embodiment, angle γ is approximately 45 degrees. Other angles may be employed.

Figure 9C:
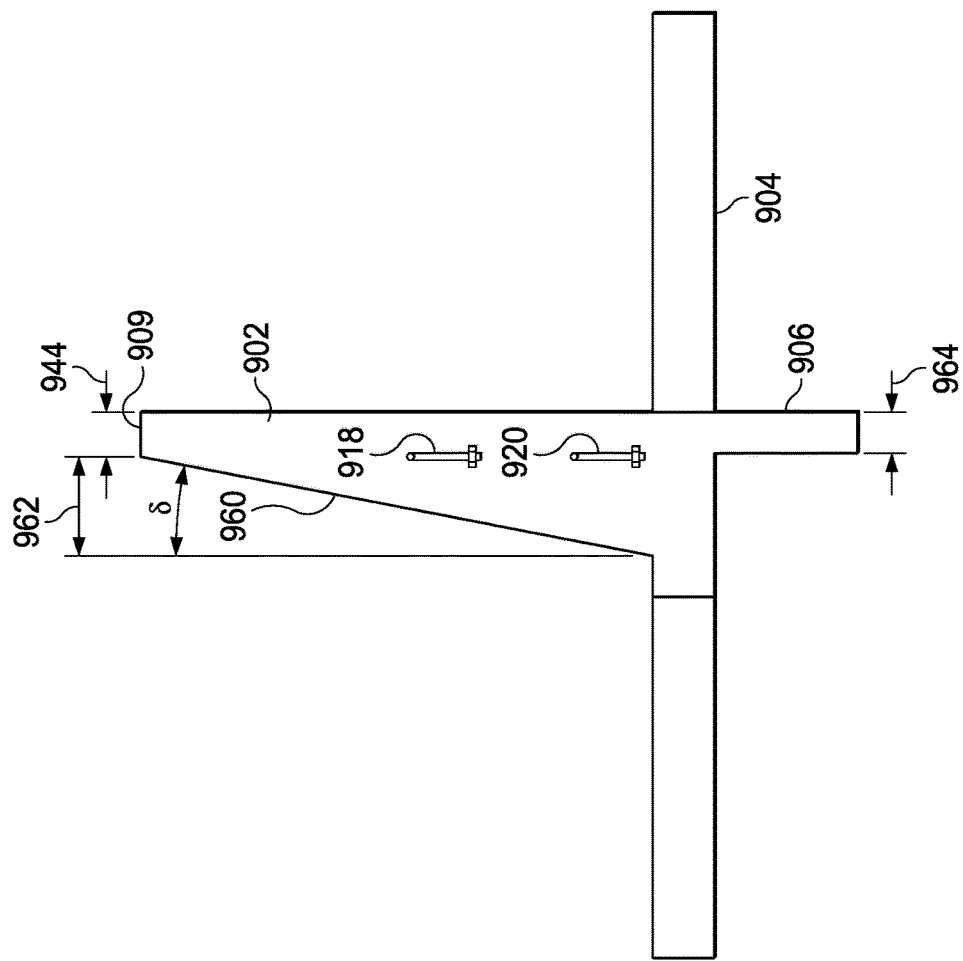
FIG. 9C is a side view of one embodiment of a low-energy modular wave-break.

Referring to FIG. 9C, rib 913 (and rib 912, not shown) includes taper 960 at angle δ. Angle δ in a preferred embodiment is 15°, but can range between 3° to 25° depending on the application. Taper 960 expands from top edge 909 to thickness 962 where wall 902 meets base 904. Anchor 906 has thickness 964. In a preferred embodiment, thickness 944 and 964 are approximately 6 inches. Other thicknesses may be employed. Thickness 962 is approximately 1 foot. Other thicknesses may be employed.

Figure 9D:
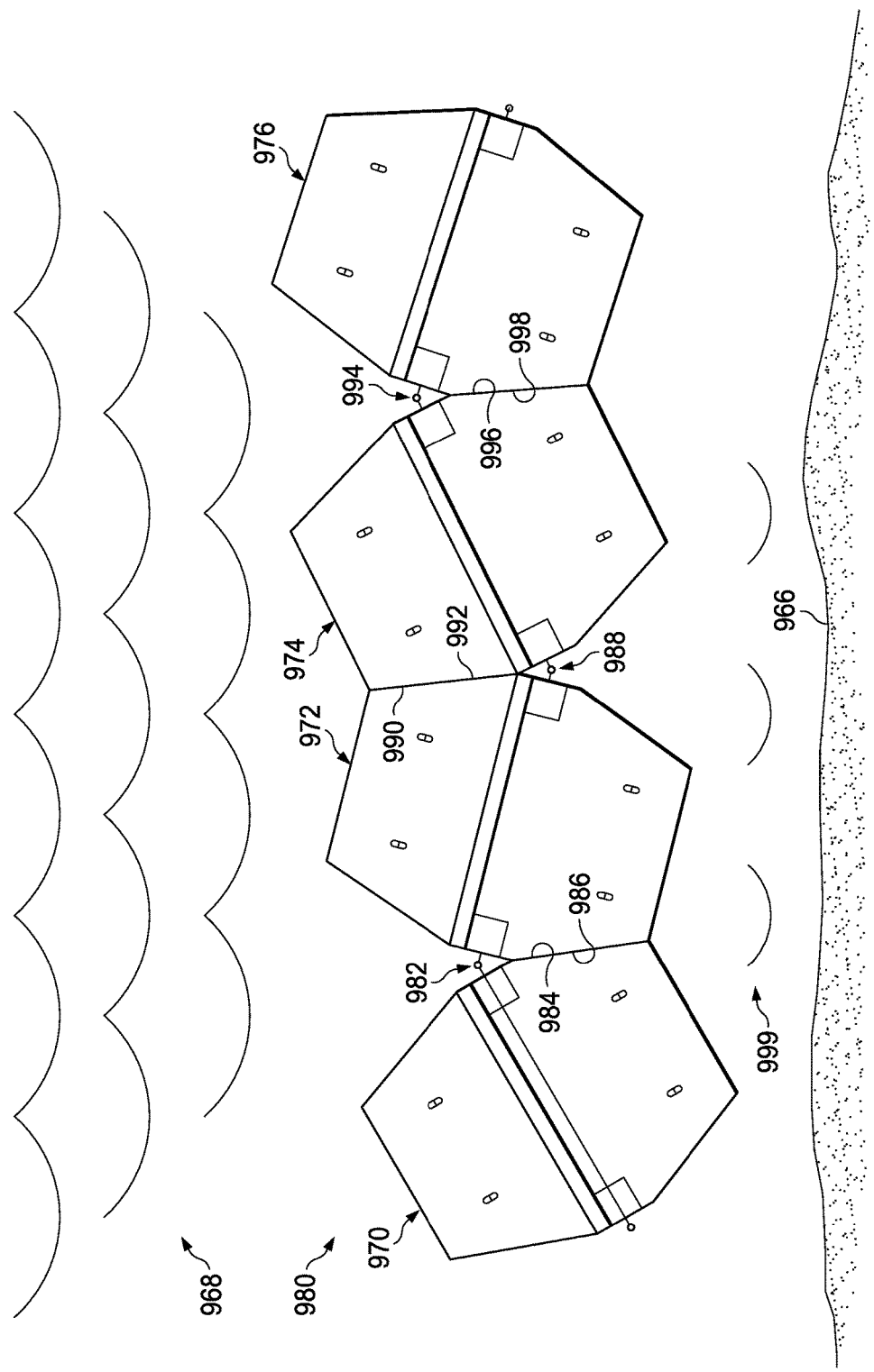
FIG. 9D is a top view of a placement of a set of modular wave-breaks near a shoreline in one embodiment.

Referring to FIG. 9D, modular wave-breaks 970, 972, 974, and 976 are connected together to form wave-break system 980. Modular wave-breaks 970 and 972 are attached via their staggered eyebolts and hooks at point 982 and positioned relative to each other such that tapered side 984 contacts tapered side 986. Modular wave-breaks 972 and 974 are attached via their staggered eyebolts and hooks at point 988 and positioned relative to each other such that tapered side 990 contacts tapered side 992. Modular wave-breaks 974 and 976 are attached via their staggered eyebolts and hooks at point 994 and positioned relative to each other such that tapered side 996 contacts tapered side 998.

Wave-break system 980 is secured to the water bottom surface near shoreline 966. Waves 968 propagating towards shoreline 966 are broken into dissipated waves 999 by wave-break system 980, protecting shoreline 966 from erosion and beachgoers from dangers such as excessive undertow.

It will be appreciated by those skilled in the art that modifications can be made to the embodiments disclosed and remain within the inventive concept. Therefore, this invention is not limited to the specific embodiments disclosed, but is intended to cover changes within the scope and spirit of the claims.

The invention claimed is:

1. A modular wave-break comprising:
a wall attached to a base, where the base extends generally perpendicularly from the wall;
an anchor attached to the base;
a set of dissipating holes in the wall, where each dissipating hole of the set of dissipating holes has a first diameter;
a set of passage holes in the wall, where each passage hole of the set of passage holes has a second diameter;
wherein the first diameter is less than the second diameter;
a set of upper structural bars embedded within the wall and the base;
a set of lower structural bars embedded within the base and the anchor, where each upper structural bar of the set of upper structural bars is not aligned with a lower structural bar of the set of lower structural bars;
wherein each of the dissipating holes of the set of dissipating holes is positioned between a pair of upper structural bars of the set of upper structural bars;
wherein the set of dissipating holes further comprises a number of dissipating holes;
wherein the set of passage holes further comprises a number of passage holes; and,
wherein a first ratio of the number of dissipating holes to the number of passage holes is greater than one.

2. The modular wave-break of claim 1, wherein the diameter of each passage hole of the set of passage holes is at least twice the diameter of each dissipating hole of the set of dissipating holes.

3. The modular wave-break of claim 1 wherein the set of dissipating holes is at least twice as large as the set of passage holes;
wherein the set of dissipating holes has a first total size based on the number of dissipating holes;
wherein the set of passage holes has a second total size based on the number of passage holes; and,
wherein a second ratio of the first total size to the second total size is greater than one.

4. The modular wave-break of claim 1, further comprising:
a first set of eyebolts connected to the wall.

5. The modular wave-break of claim 4, further comprising:
a second set of eyebolts connected to the wall, opposite the first set of eyebolts.

6. The modular wave-break of claim 5, wherein the first set of eyebolts and the second set of eyebolts are staggered in height.

7. The modular wave-break of claim 1 further comprising a barrier attached to the wall.

8. The modular wave-break of claim 1 wherein the base includes a set of tapered sides.

9. A wave-break system for dissipating a wave over a water bottom surface comprising:
a wall having a first side portion, a central portion, and a second side portion;
the wall attached to a base, wherein the base is connected to the water bottom surface;
an anchor attached to the base, wherein the base is buried under the water bottom surface;
a first set of dissipating holes integrally formed in the wall and a first passage hole integrally formed in the wall are between the first side portion and the central portion;
wherein each dissipating hole of the first set of dissipating holes has a first diameter;
wherein the first passage hole has a second diameter;
wherein the first diameter is less than the second diameter;
wherein the first set of dissipating holes further comprises a first number of dissipating holes greater than one; and,
a second set of dissipating holes integrally formed in the wall and a second passage hole integrally formed in the wall between the central portion and the second side portion;
wherein each dissipating hole of the second set of dissipating holes has a third diameter;
wherein the second passage hole has a fourth diameter;
wherein the third diameter is less than the fourth diameter; and,
wherein the second set of dissipating holes further comprises a second number of dissipating holes greater than one;
whereby the wave is dissipated upon contact with the wall.

10. The wave-break system of claim 9, further comprising a geotechnical barrier attached to the wall.

11. The wave-break system of claim 9, further comprising:
a first set of eyebolts connected to the wall at a first location.

12. The wave-break system of claim 11, further comprising:
a second set of eyebolts connected to the wall at a second location.

13. The wave-break system of claim 12, wherein the first location and the second location are staggered.

14. The wave-break system of claim 9, wherein the first passage hole is bounded by the first set of dissipating holes and the base.

15. The wave-break system of claim 9, wherein the second passage hole is bounded by the second set of dissipating holes and the base.

16. The wave-break system of claim 9, wherein the base includes a set of tapered sides.

17. A system for breaking waves, the system comprising:
a set of modular wave-breaks;
each of the modular wave-breaks including:
a wall having a first side portion, a central portion, and a second side portion;
the wall attached to a base, wherein the base is connected to a water bottom surface;
an anchor attached to the base, wherein the base is buried under the water bottom surface;
a first set of dissipating holes integrally formed in the wall and a first passage hole integrally formed in the wall are between the first side portion and the central portion;
wherein each dissipating hole of the first set of dissipating holes has a first diameter;
wherein the first passage hole has a second diameter;
wherein the first diameter is less than the second diameter; and, a second set of dissipating holes integrally formed in the wall and a second passage hole integrally formed in the wall between the central portion and the second side portion;

wherein each dissipating hole of the second set of dissipating holes has a third diameter;

wherein the second passage hole has a fourth diameter;

wherein the third diameter is less than the fourth diameter;

wherein the first set of dissipating holes further comprises a first number of dissipating holes greater than one;

wherein the second set of dissipating holes further comprises a second number of dissipating holes greater than one.

18. The system of claim 17 further comprising:

the base having a set of four tapered sides that are each offset at one of a set of angles from one of the first side and the second side; and, the set of angles including approximately 15 degrees, approximately 30 degrees, and approximately 45 degrees.

19. The system of claim 17 further comprising:

the wall including a set of ribs that each increase in thickness from a top edge towards the base;

each rib including a taper at one of a second set of angles selected from the range of 3 degrees to 25 degrees; and, the anchor having a thickness that is one of approximately 6 inches and approximately 1 foot.

20. The system of claim 17 further comprising:

each of the modular wave-breaks including:
  a set of staggered eyebolts;
  a set of hooks;

the set of modular wave-breaks connected together and attached via the sets of staggered eyebolts and sets of hooks; and, a first modular wave-break of the set of modular wave-breaks positioned to have a tapered side of the first modular wave-break contact a tapered side of a second modular wave-break of the set of modular wave-breaks.

21. A modular wave-break for dissipating energy of a water mass forming a wave comprising:

a wall attached to a base, where the base extends generally perpendicularly from the wall;

an anchor attached to the base;

a set of dissipating holes in the wall, where each dissipating hole of the set of dissipating holes has a first diameter;

a set of passage holes in the wall, where each passage hole of the set of passage holes has a second diameter;

wherein each passage hole is below a surface of the water mass;

wherein the first diameter is less than the second diameter;

a set of upper structural bars embedded within the wall and the base;

a set of lower structural bars embedded within the base and the anchor, where each upper structural bar of the set of upper structural bars is offset along the width from each lower structural bar of the set of lower structural bars;

wherein each of the dissipating holes of the set of dissipating holes is between a pair of upper structural bars of the set of upper structural bars;

wherein the set of dissipating holes further comprises a number of dissipating holes;

wherein the set of passage holes further comprises a number of passage holes;

wherein a ratio of the number of dissipating holes to the number of passage holes is greater than one; and, wherein the set of dissipating holes is positioned on the wall to dissipate an energy of the wave.

\* \* \* \* \*